(12) United States Patent
Joffray

(10) Patent No.: US 10,454,972 B2
(45) Date of Patent: Oct. 22, 2019

(54) METHOD FOR PROTECTING INTANGIBLE ASSETS IN TELECOMMUNICATIONS NETWORKS

(71) Applicant: Olivier Joffray, Feucherolles (FR)

(72) Inventor: Olivier Joffray, Feucherolles (FR)

(*) Notice: Subject to any disclaimer, the term of this patent is extended or adjusted under 35 U.S.C. 154(b) by 77 days.

(21) Appl. No.: 15/321,797

(22) PCT Filed: Jun. 25, 2015

(86) PCT No.: PCT/FR2015/000125
§ 371 (c)(1),
(2) Date: Apr. 28, 2017

(87) PCT Pub. No.: WO2015/197925
PCT Pub. Date: Dec. 30, 2015

(65) Prior Publication Data
US 2017/0230420 A1    Aug. 10, 2017

(30) Foreign Application Priority Data

Jun. 26, 2014  (FR) ...................................... 14 01429

(51) Int. Cl.
*H04L 29/06* (2006.01)
*G06Q 10/06* (2012.01)
*G06Q 30/00* (2012.01)

(52) U.S. Cl.
CPC .............. *H04L 63/20* (2013.01); *H04L 63/04* (2013.01); *G06Q 10/0631* (2013.01); *G06Q 30/018* (2013.01)

(58) Field of Classification Search
CPC ....... H04L 63/20; H04L 63/04; G06Q 30/018; G06Q 30/01; G06F 13/28; G06F 13/1689
See application file for complete search history.

(56) References Cited

U.S. PATENT DOCUMENTS

| | | | | |
|---|---|---|---|---|
| 7,594,267 | B2* | 9/2009 | Gladstone | G06F 21/55 725/25 |
| 8,010,333 | B2 | 8/2011 | Colombo et al. | |
| 8,498,619 | B2* | 7/2013 | Lindteigen | H04L 63/083 455/410 |
| 2004/0025011 | A1* | 2/2004 | Azema | G06F 21/10 713/156 |
| 2004/0143428 | A1* | 7/2004 | Rappaport | G06F 17/509 703/22 |

(Continued)

FOREIGN PATENT DOCUMENTS

WO    WO 2005001726 A1    1/2005

OTHER PUBLICATIONS

International Search Report dated Nov. 5, 2015, for International Patent Application No. PCT/FR2015/000125.

(Continued)

*Primary Examiner* — Kenneth W Chang
(74) *Attorney, Agent, or Firm* — Karceski IP Law, PLLC

(57) ABSTRACT

The invention relates to a method for protecting assets used by certified communication devices connected to networks, and for guaranteeing the behavior of said devices, which consists of calculating parameters intended for said devices, by means of an expert system, in order to program the behavior thereof and ensure the protection of said assets, according to known objectives.

12 Claims, 8 Drawing Sheets

(56) References Cited

U.S. PATENT DOCUMENTS

| | | | |
|---|---|---|---|
| 2005/0260996 A1* | 11/2005 | van de Groenendaal | H04L 63/102 455/445 |
| 2005/0262086 A1* | 11/2005 | Ta | G06F 21/10 |
| 2006/0293936 A1* | 12/2006 | Breiter | G06Q 10/06 705/7.25 |
| 2007/0039046 A1* | 2/2007 | Van Dijk | G06F 21/52 726/22 |
| 2007/0180490 A1* | 8/2007 | Renzi | G06F 21/577 726/1 |
| 2008/0106605 A1* | 5/2008 | Schrijen | G06F 21/60 348/207.99 |
| 2011/0161898 A1 | 6/2011 | Chauhdry et al. | |
| 2013/0124704 A1* | 5/2013 | Bhogal | G06F 9/5072 709/223 |
| 2015/0026800 A1* | 1/2015 | Jain | H04L 63/1458 726/22 |

OTHER PUBLICATIONS

Sam et al., "Web Services Customization: A Composition Based Approach," ISIM 2006, Apr. 25-26, 2006, pp. 157-164.

\* cited by examiner

METHOD FOR PROTECTING INTANGIBLE ASSETS IN TELECOMMUNICATIONS NETWORKS

CROSS-REFERENCE TO RELATED APPLICATION(S)

This is a National Stage Entry into the United States Patent and Trademark Office from International Patent Application No. PCT/FR2015/000125, having an international filing date of Jun. 25, 2015, which claims priority to French Patent Application No. 1401429, filed Jun. 26, 2014, the entire contents of both of which are incorporated herein by reference.

FIELD OF THE INVENTION

The invention relates to the technological field of communicating devices organized into networks. It comprises a method and a device constituted from telecommunications networks wherein guarantees are made for the security of the assets present in the networks, and the behaviors of the communicating devices constituting the networks.

SUMMARY OF THE INVENTION AND DESCRIPTION OF THE RELATED ART

Depending on the case, the information exchanged must be protected, the performance of certain actions must be guaranteed, and the performance of other actions must be ensured to only take place under certain conditions. The method presented in this invention uses communicating devices whose behavior is known and guaranteed. An expert system calculates the parameters to be transmitted to said devices so that the networks that they constitute form an assembly wherein the security of the data is ensured and the target actions are implemented. The calculations use the formal descriptions of the communicating devices and goals to be achieved.

Numerous cases exist of communications networks requiring protection: business computer networks, Smart Grids or power grids comprising smart meters (Linky meters in France), applications on smart phones and tablets, communications between payment systems for retailers and banks, etc. The invention applies to all telecommunications networks constituted from communicating devices, regardless of the nature thereof, provided that the behaviors of said devices and the security goals to be achieved can be formally described. The method implemented according to the invention calculates the parameters of the devices, so that they behave individually in such a manner that the defined goals are achieved.

Industrialized products are being increasingly designed in accordance with international standards, which allow hardware manufactured by different companies to work together. This in particular applies for hardware in communication with each other. For example, computer networks, the Internet, audio/video devices with HDMI connections, industrial exchange and controller supervision networks, etc. All of these communicating products comply with standards designed to address multiple functions and meet varied needs. Computer network equipment such as routers, gateways, Wi-Fi access points, network cards, etc. are functions that can be implemented in specialized hardware or in versatile hardware with multiple embedded functions.

The invention also allows for the certification that the goals have been achieved, including in cases where the communicating devices constituting the networks are located at a distance from each other.

The operational characteristics of the communicating devices, whose parameters are calculated, are known, guaranteed and formally described, in particular the available functions and their parameters, as well as the results delivered. The networks constituted by the interconnections between said devices can be public, private, or confidential, etc. Business networks very commonly make resources available to their employees, and access to these resources is not possible from outside the company, or if the connected equipment is not recognized on the network. Access to certain resources can also be reserved to certain members of staff within an organization, for confidentiality or cost reasons (for example the use of a color printer is often reserved to a few members of staff within the company).

The means to be implemented to guarantee the behavior of a communicating device depend on the object itself and the desired level of guarantee.

Embedded security in smart cards is often verified by an independent body before distribution of the cards. This is in particular the case of French bank cards, electronic passports (which have an embedded smart card electronic component), and chip-based ID cards. This verification is often performed, according to the Common Criteria for information technology security evaluation (see: http://www.ssi.gouv.fr/fr/certification-qualification/cc/ or http://www.commoncriteriaportal.org/). The security verification of a smart card is very strict due to the importance of the data handled by the card (identity of individuals, electronic payment means, etc.).

The tangible verification of the behavior of a communicating device by an independent body is not systematic. If the aim is to guarantee a tangible electronic security level to protect against identified risks, it would be preferable to check that each communicating device has the characteristics allowing it to withstand the risks to which is it subjected. If the aim is to obtain a commitment regarding the functions provided by a communicating device, such as data storage accompanied by an acknowledgement of receipt upon each use of the service, a commercial contract between the parties accompanied by the formal description of the functions provided by the communicating device are sufficient.

The devices are configured so that their modes of operation correspond to the goals set. The more versatile a product, the more complex these configurations. If this involves the configuration of different equipment, originating from different sources and with varied functions, the task may become laborious and cause security breaches or malfunctions, in particular when concerning hardware for computer networks. The topic is all the more difficult to address as these networks undergo very frequent changes, when adding or deleting users, during meetings when guests connect to the networks, when renewing hardware (e.g. a PC), when upgrading software or when replacing an interconnection point to handle increased volumes of transactions that require processing (e.g. the installation of a new router to handle the arrival of fifty additional people on a site).

The invention applies to electronic data processing in large companies, in addition to processing personal data, which is highly regulated in France and Europe. Document "COM(2012) 11 final—2012/0011 (COD)" is a proposal for a regulation of the European parliament and of the council on the protection of individuals with regard to the processing of personal data and on the free movement of such data (General Data Protection Regulation). The purpose of this regulation is to protect the fundamental rights and freedoms of natural persons. It lays down the rules to be complied with for the processing of personal data by automated means. The requirements presented in this proposal for a regulation are multiple, complicated, and are a source of complexity in the interactions taking place between companies and individuals, and between different companies.

Based on the formal description of the technical goals to be achieved in order to comply with such a regulation, the invention calculates the parameters required to achieve said goals.

If the goals to be achieved include actions to be performed, such as the deletion of data, the invention calculates the parameters of the certified devices so that they calculate and deliver a seal that certifies that the action was conducted successfully.

The invention further applies to critical processes and systems and those designed so that they never break down, such as IT systems that operate in aircraft or in nuclear power stations. Due to their sizes and complexities, developing and guaranteeing such systems is both difficult and expensive. It is, however, simpler to design, verify and guarantee the behavior of smaller devices in communication with each other. Organized into networks, and configured with values calculated thanks to the invention, these communicating devices achieve the same goals, however at a reduced cost.

The description of an information system and its users can use imperative expressions or declarative expressions.

The use of imperative expressions consists in the operational description of the system, i.e. in describing how the functions that it provides are performed, step by step. Programming languages such as C or Java are constituted from imperative expressions.

The use of declarative expressions consists in describing what is expected of the system, without referring to the method that will enable its implementation.

The method described in this invention works with the two description modes.

The protection of information systems is a topic addressed through varied approaches that depend on the type of information system and the threats that it must face.

A mobile device such as a smart bank card is not subjected to the same threats as the information system of a hospital on which patient medical files are stored.

The "U.S. Pat. No. 8,010,333 B2" entitled "Processing for developing and implementing a model for the formal description of a collaborative system comprised of multiple distributed components, especially an intelligent, flexible production and/or process automation system", describes a process that simplifies the development and implementation of a formal model describing a collaborative system of multiple distributed components. It describes the modeling of components, as well as the interfaces enabling them to communicate with each other, in order to calculate and implement a model describing a real production system comprising automation processes. It also describes the identification and modeling of the characteristics of the components in a catalogue used to build the model. The modeling performed consists in a High-Level Petri Net. The invention includes the general principles of individual modeling of components (including their communication interfaces), the cataloguing of these components and their characteristics, as well as the modeling and the cataloguing of rules, however with a different purpose and according to a different method.

The following four security properties are used to define the protections of an asset:
1. Access control.
2. Confidentiality.
3. Integrity.
4. Authenticity.

The access control rules are defined depending on the users of the element. By prohibiting unauthorized users to access an element, the access control ensures the confidentiality, integrity and authenticity of the asset; the quality of the protection depends on the characteristics of the element's container.

Access to an electronic data item can be limited by defining rules directly on the data item (example: file available for reading by anyone, writing reserved to the file's creator). Access to the data item can also be limited by controlling access to the physical medium on which it is stored (example: to access a file stored on a flash drive only, the flash drive must be accessed).

If a data item is stored on a simple memory such as a flash drive, it is less protected than if it is stored on a secure smart card; in the first case, an individual simply needs to be in possession of the medium to access the data item, whereas in the second case, access to said data item is controlled by the card, which only authorizes access thereto under certain conditions.

Confidentiality is ensured if the protected element cannot be copied or stolen.

The confidentiality of the data exchanged over the networks is protected if the recovery of the flowing information does not allow the protected element to be obtained (for example if it is encrypted during the communications).

The integrity is ensured if the element cannot be modified; it exclusively depends on the medium on which the element is stored.

A smart card ensures the integrity of a data item if it is programmed to refuse the modification thereof. The integrity of a data item exchanged over a network cannot be ensured as it may have been altered during the transfer. When received, its integrity is checked using an information item that accompanies it (example: cyclic redundancy code), however no means exist for guaranteeing that a data item exchanged over a network will conserve its integrity.

If the integrity of an element transmitted over the networks is ensured, this means that the recipient has checked the integrity during receipt and that the former possesses an element compliant with that transmitted.

The authenticity of an element is ensured if a prohibited modification is detected before it is used, therefore before a problem occurs.

If this involves protecting an element, the properties to be guaranteed can be ensured directly for the element, or they can be inherited from the environment in which it is used.

For example, if the smart card holder inputs his/her secret code, he/she authenticates himself/herself to the card. When the card produces an element accessible under the condition that its holder is authenticated, the reader in which it is inserted inherits the "card holder authenticated" property. This is what happens with SIM cards in mobile phones; the card only produces the cryptogram that opens access to the telecommunications network if the holder's PIN code has been input.

This property allows the security to be proven from beginning to end.

The means used to implement the four security properties depend on the element that must be protected and the available technologies, among which cryptography is particularly well suited.

Confidentiality is ensured by encrypting and decrypting the data.

To check the integrity of the data exchanged, it is transmitted accompanied by a unique cryptogram that will be checked by the recipient.

The authenticity is established if the cryptogram that accompanies the asset can be checked using a key that only those taking part in the exchange know. Symmetric-key cryptography is suitable if non-repudiation is not required (all participants know the secret key and are capable of calculating or checking the authentication cryptogram). Otherwise, the electronic signature and asymmetric or public key cryptography are used (only the signatory knows the private key).

Access control uses cryptography to authorize or reject access requests. The challenge/response authentication mechanism is a classic example of that used.

Just as the safest motor vehicles have a Euro NCAP certificate, computer hardware can be assessed and certified. The internationally-renowned method for evaluating information technologies is known as the: "Common Criteria for Information Technology Security Evaluation". It is presented on the following websites:

http://www.ssi.gouv.fr/fr/certification-qualification/cc/
http://www.commoncriteriaportal.org/

Other evaluation systems exist and apply depending on the country (example: the CSPN system in France); private systems also exist, designed for a specific use (example: EMVCO, VCSP or CAST systems defined to tackle electronic payment security).

The evaluation systems are used to evaluate hardware in an identified configuration and context. At the end of a successful evaluation, the authority responsible for the evaluation system issues a certificate guaranteeing that the object subject to the evaluation complies with the expectations.

The General Security Referential (RGS for Référentiel Général de Sécurité in French) is a documentation package issued in France by the French National Digital Security Agency (ANSSI for Agence Nationale de Sécurité des Systèmes d'Information in French).

These documents describe the rules governing the implementation of security measures in information systems. These are not technical specifications as the documents do not impose the method used to implement the security measures; instead they indicate what is expected of a system for it to be compliant with the RGS.

The IAS-ECC applet is a generic and configurable cryptographic engine. Several versions of this applet have been evaluated and certified according to the common criteria system. The prior art constituted by this specification is advantageous for a preferred embodiment of this invention, in particular its object-oriented architecture applied to the management of access rights.

The IAS-ECC applet defines several types of SDOs that propose different services. The following four such services are proposed:

PIN (secret code):
It is used to authenticate a user by checking his/her PIN. A PIN can be changed or unlocked.

Symmetric key pair (key cryptography):
It is used to establish a communication channel, the confidentiality and integrity of which is protected after mutual authentication has taken place.

Asymmetric public key (public key cryptography):
It is used to check the authenticity of the electronic signatures, in particular the signatures of the public key certificates used in the PKI architectures (Public Key Infrastructure); it is also used to encrypt messages to guarantee confidentiality.

Asymmetric private key (public key cryptography):
It is used to calculate authentic electronic signatures, or to decrypt messages.

Each type of SDO designates an object that proposes services that vary depending on its type. When it is instantiated, an SDO is customized with parameters that in particular define:

The conditions for acquiring the right to use a service, or for upgrading an object.

The conditions for using the services, in particular the key length (or PIN length), the algorithm with which it can be used, the mode of use, etc., which ensures that an object will be systematically used as expected.

The additional information useful for management purposes.

The SDO technique provides high versatility in defining the conditions for using the services.

Let us consider the case whereby one is looking to use a service S1 on an object SDO1. If one of these basic properties is required, the condition for using the service S1 points to another object SDO2 which proposes the service S2 allowing for the implementation of the conditions ensuring the expected property for acquiring the right to use S1. If the service S2 is not free to use, the usage condition points to one or more other services S3, S4, . . . Sn proposed by other SDOs. A recursive procedure is used to browse all SDOs pointed to until the free access service(s) is(are) found, which will release the use of the services of the previously browsed SDOs, and thus trace back to the service S1 to which access will then be authorized.

There is no logical limit to the imaginable combinations for defining the conditions for accessing the services of an SDO. The limit is determined by the maximum number of SDOs that the application can contain. The specifications of this application and its operating environment are described on the following website: http://www.ants.interieur.gouv.fr/ias/IAS.html The Backus-Naur Form (often referred to as BNF) is a notation used to describe the grammar rules of programming languages. It is therefore a meta language. It is used in certain books to describe the language studied, but also by numerous syntactic analysis software items for working on source files in multiple different languages. It is a notation for formal context-free type grammars (as the terms are defined without their context, to subsequently replace the definition of said terms in this context).

The formal verification methods are techniques used to rigorously reason, using mathematical logic. They can apply to computer programs or electronic hardware in order to demonstrate their validity with regard to a specification. The formal methods are based on program semantics, i.e. on the formal descriptions of the behavior of the program obtained from its source code, or from its object code if the transformation of the source code to the object code has not altered said descriptions.

The formal methods can be used to provide a specification of the system that one is looking to develop, to the desired level of detail. A formal specification of the system is based on a formal language, the semantics of which is well defined (unlike a verbose specification, which can result in different interpretations). This formal description of the system can be used as a reference during development. Moreover, it can be used to formally check that the end production of the system (described in a dedicated computer language) complies with the initial expectations (in particular in terms of functionality). The need for formal methods has been felt for a long time. In the Algol 60 report, John Backus presented a formal notation to describe the grammar of programming languages (notation referred to as the Backus-Naur Form, BNF).

Several laboratories exist throughout the world that study formal methods. There are also several languages and several tools for implementing said formal methods. One example of this is the COQ tool developed at INRIA (French National Institute for Computer Science and Automation or Institut National de Recherche en Informatique et en Automatique in French—see http://coq.inria.fr/), which is often used during Common Criteria certifications performed under the auspices of the ANSSI (French National Digital Security Agency or Agence National de la Sécurité des Systèmes d'Information in French). In particular, COQ is used to ensure that a formal model meets the rules described in a reference specification by performing algorithmic verifications (model checking), said rules being themselves formally expressed.

The Software Design Group of the MIT (Massachusetts Institute of Technology) has developed the Alloy tool suite (see http://alloy.mit.edu), which is constituted from a language for describing structures and a tool for exploring them. Alloy was specially developed to tackle a lightweight form of formal methods.

The formal methods are used to obtain a high level of assurance with regard to the behavior of a computer program designed with a precise purpose thanks to the use of proof assistants. A proof assistant is a software item used to write and verify mathematical proofs, in particular on assertions involving the running of computer programs. This method is particularly suited to problems that are difficult to resolve using other tools proposed by formal methods.

An expert system is a computer tool designed to simulate the knowledge of a specialist in a specific and defined field. It operates by using the knowledge explicitly provided by experts in the field. It is used to model the reasoning of an expert, handle knowledge in a declarative form, ease the acquisition, modification and updating thereof, and produce explanations on the manner in which the results of an expert analysis are obtained.

The invention provides strong guarantees on the security of the assets used in the networks and on the behavior of the hardware and software connected via networks, by calculating the parameters that program their operational behavior according to the goals to be achieved. The devices connected to the networks deliver seals which certify the functions that they implement in order to prove that the target goals have been achieved.

In order to protect an asset, access thereto can be restricted, and the confidentiality, integrity and authenticity thereof can be ensured. An asset can be a data item or a resource such as a function or a usage right.

In order to prove a fact, the certified communicating devices that take part in its occurrence deliver proof elements corresponding to the operations that they perform.

An element that proves the performance of a function can be of two kinds:
1. It is either a data item that can be verified by the party requesting the proof, such as an electronic signature transmitted over the communications networks and that can, as for any other asset, be protected according to the goals.
2. Or it is a signal that can be understood by a user, a communicating device or an appliance, such as the illumination of a light-emitting diode on an appliance to inform a user, or the activation of a relay that closes or opens a circuit.

The behaviors of the hardware and software that constitute the networks are described and guaranteed so as to be able to guarantee that the goals have been achieved. These formal descriptions can be constituted from imperative expressions and declarative expressions.

The invention allows for the calculation of the parameters that strongly guarantee that the goals defined by the network managers are achieved.

The models of the communicating devices that take part in the networks and the models of the goals to be achieved are used to calculate the appropriate parameters. The calculations are performed using an expert system that uses the formal descriptions of the networks, of their components and of the goals targeted, and that calculates the parameters to be transmitted to the communicating devices so that they behave in line with the goals.

BRIEF DESCRIPTION OF THE DRAWINGS

Other specific purposes, functions and advantages of the invention shall appear upon reading the description of the preferred embodiment, which is a non-limiting example, with reference to the appended figures, in which:

FIG. 4 shows the logic organization of a goal (GOAL), and of a proof (PROOF), chosen by the network manager (NM), wherein:

a goal (GOAL) comprises a plurality of networks (NET), a plurality of users (USR), and a plurality of usage conditions (CDT), a proof (PROOF) comprising the reference of a goal (GOAL) for which the network manager (NM) requests a certificate.

Figure 5:
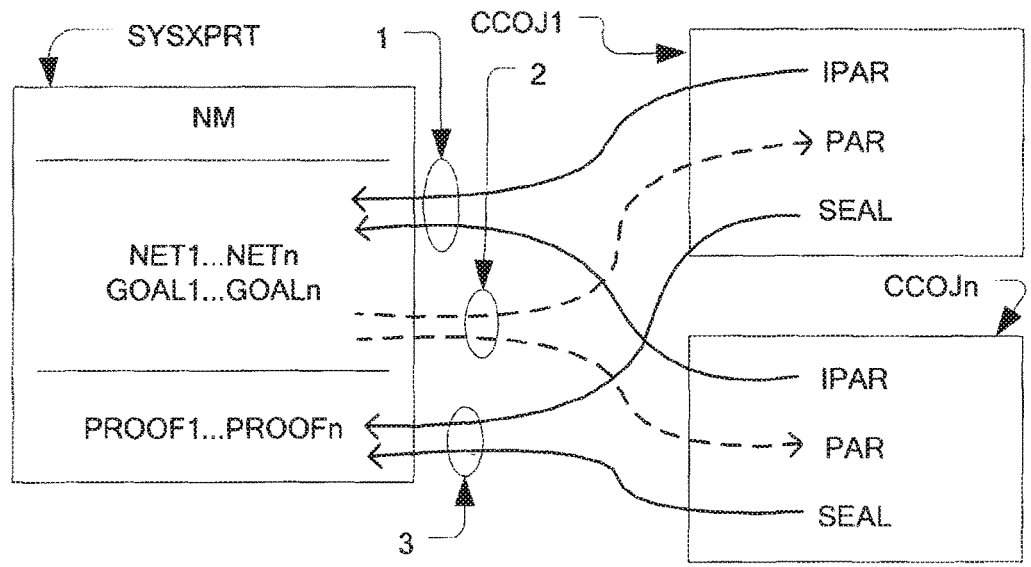

FIG. 5 is a diagrammatic view of exchanges between the certified communicating devices (CCOJ1 to CCOJn) and an expert system (SYSXPRT) wherein:

the initial parameters (IPAR) of the certified communicating devices are transmitted (1) to the expert system, the parameters (PAR) calculated by the expert system are transmitted (2) to the certified communicating devices, the certified communicating devices transmit (3) seals (SEAL) to the expert system.

Figure 6:
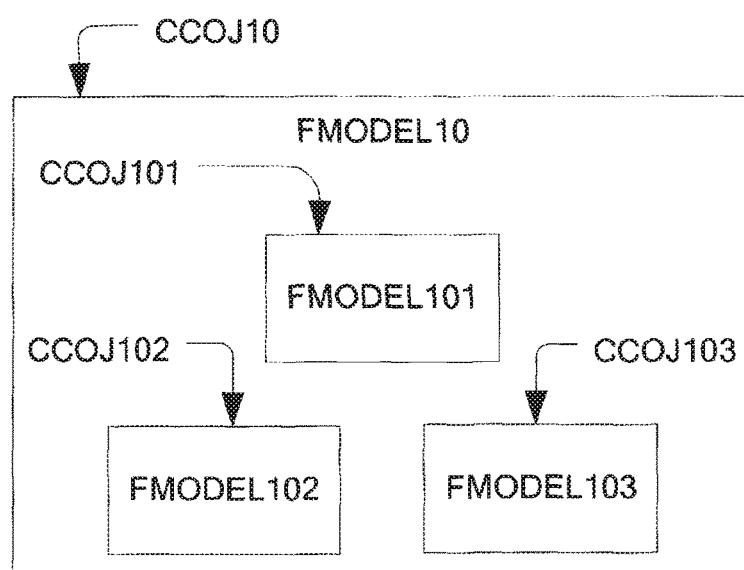

FIG. 6 shows the logic organization of a certified communicating device (CCOJ10) in which three other certified communicating devices (CCOJ101, CCOJ102, CCOJ103) are encapsulated.

Figure 7:
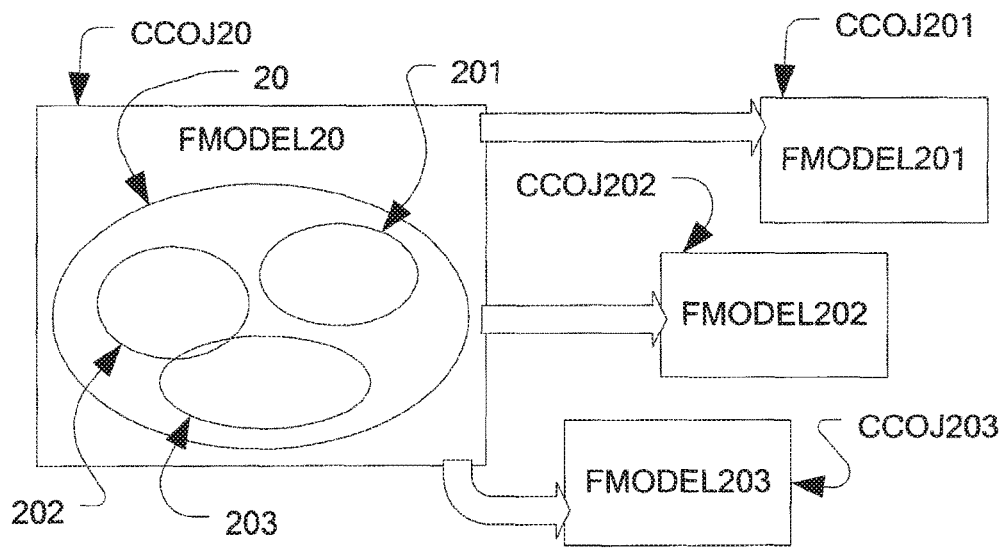

FIG. 7 is a diagrammatic view of a certified communicating device (CCOJ20) whose functions (20, 201, 202, 203) are used to present it according to three other certified communicating devices (CCOJ201, CCOJ202, CCOJ203).

Figure 8:
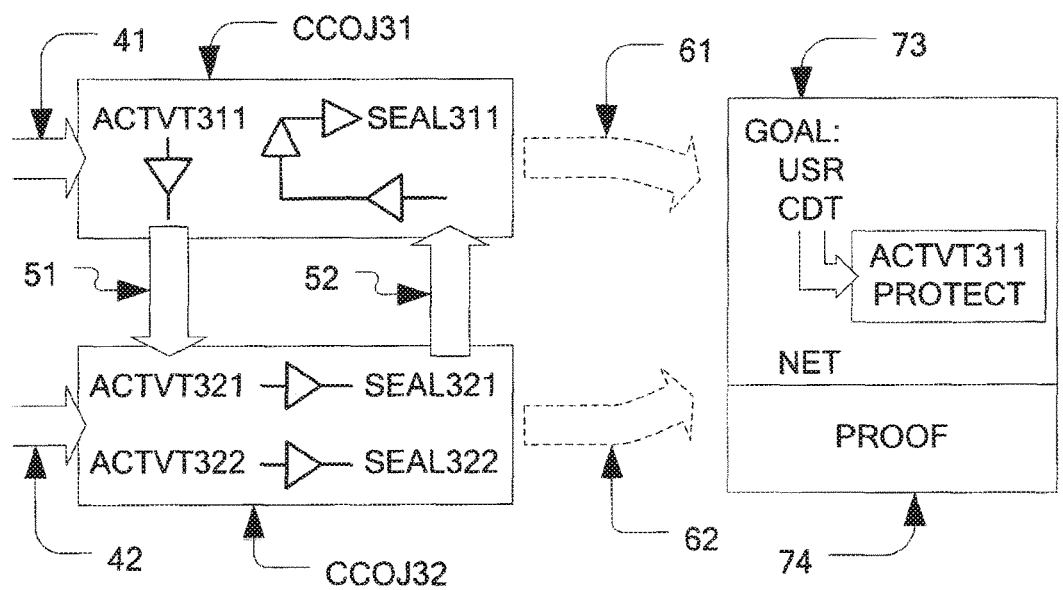

FIG. 8 is a diagrammatic view of two certified communicating devices (CCOJ31, CCOJ32) whose activities (ACTVT311, ACTVT321, ACTVT322) are used in combinations, to achieve a goal (73) and provide a proof (74).

Figure 9:
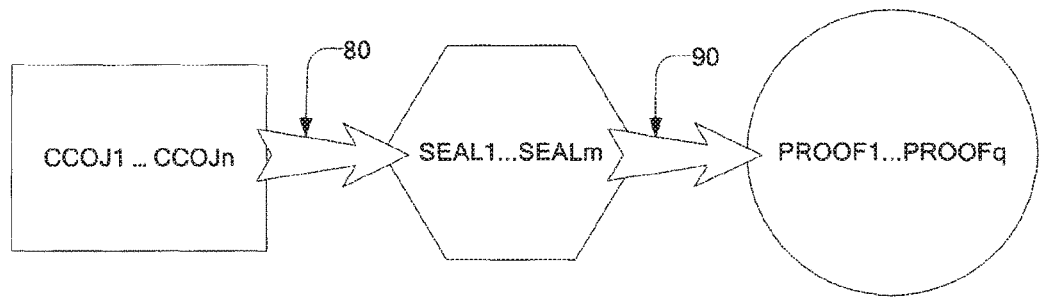

FIG. 9 is a diagrammatic view of a plurality of certified communicating devices (CCOJ1 . . . CCOJn), which deliver a plurality of seals (SEAL1 . . . SEALm), to constitute the proofs (PROOF1 . . . PROOFq).

Figure 10:
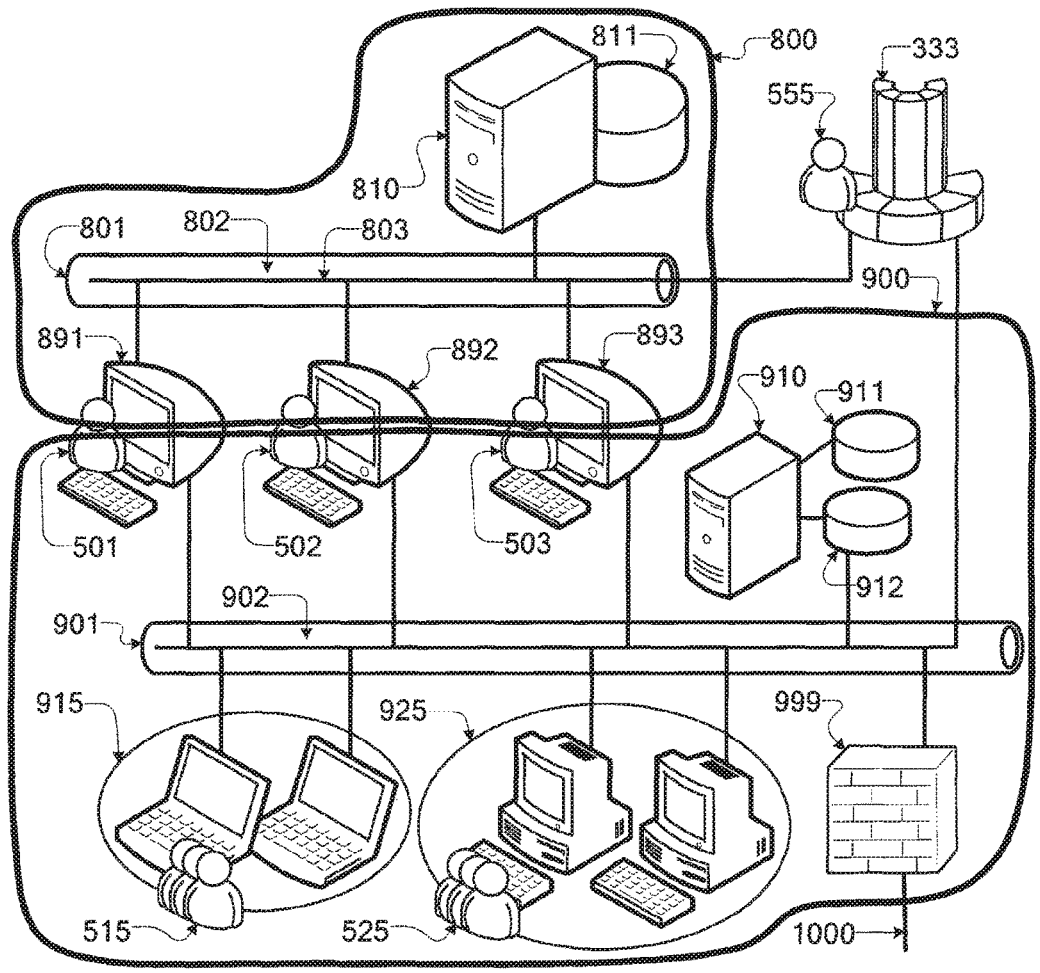

FIG. 10 is a diagrammatic view of a local computer network.

Figure 11:
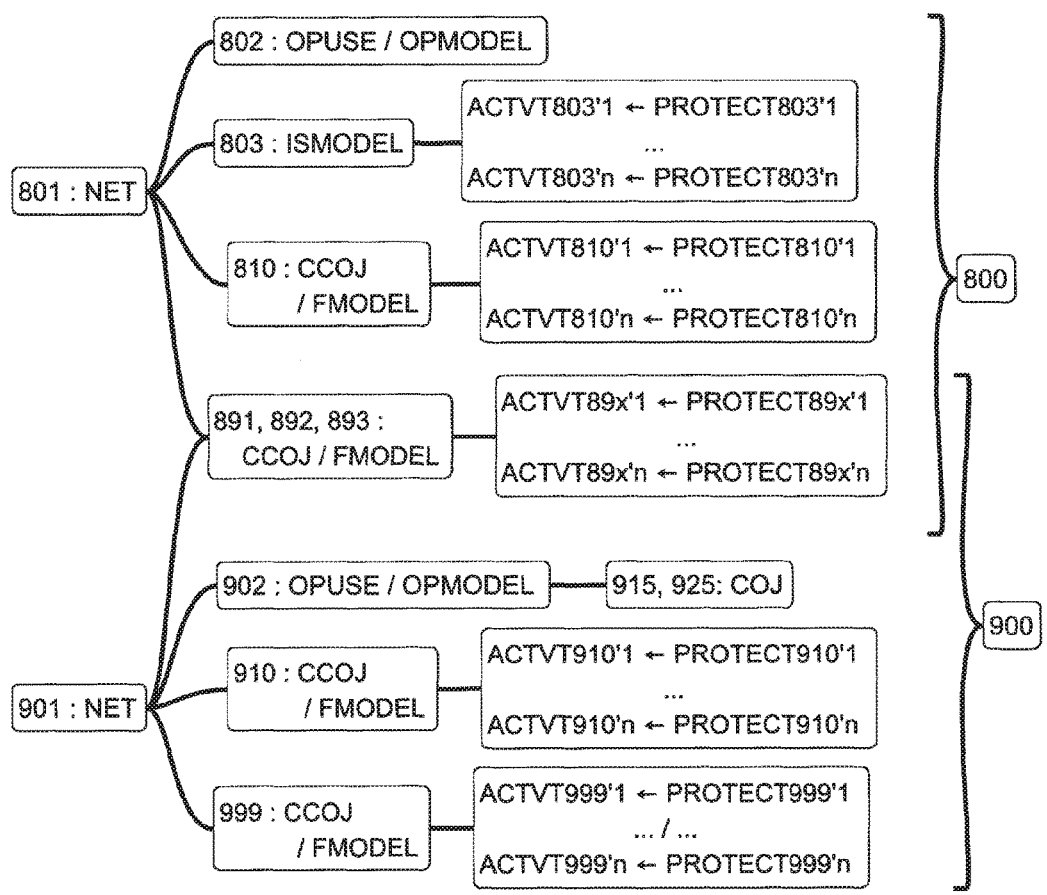

FIG. 11 shows the logic organization of the formal descriptions of a local computer network.

Figure 12:
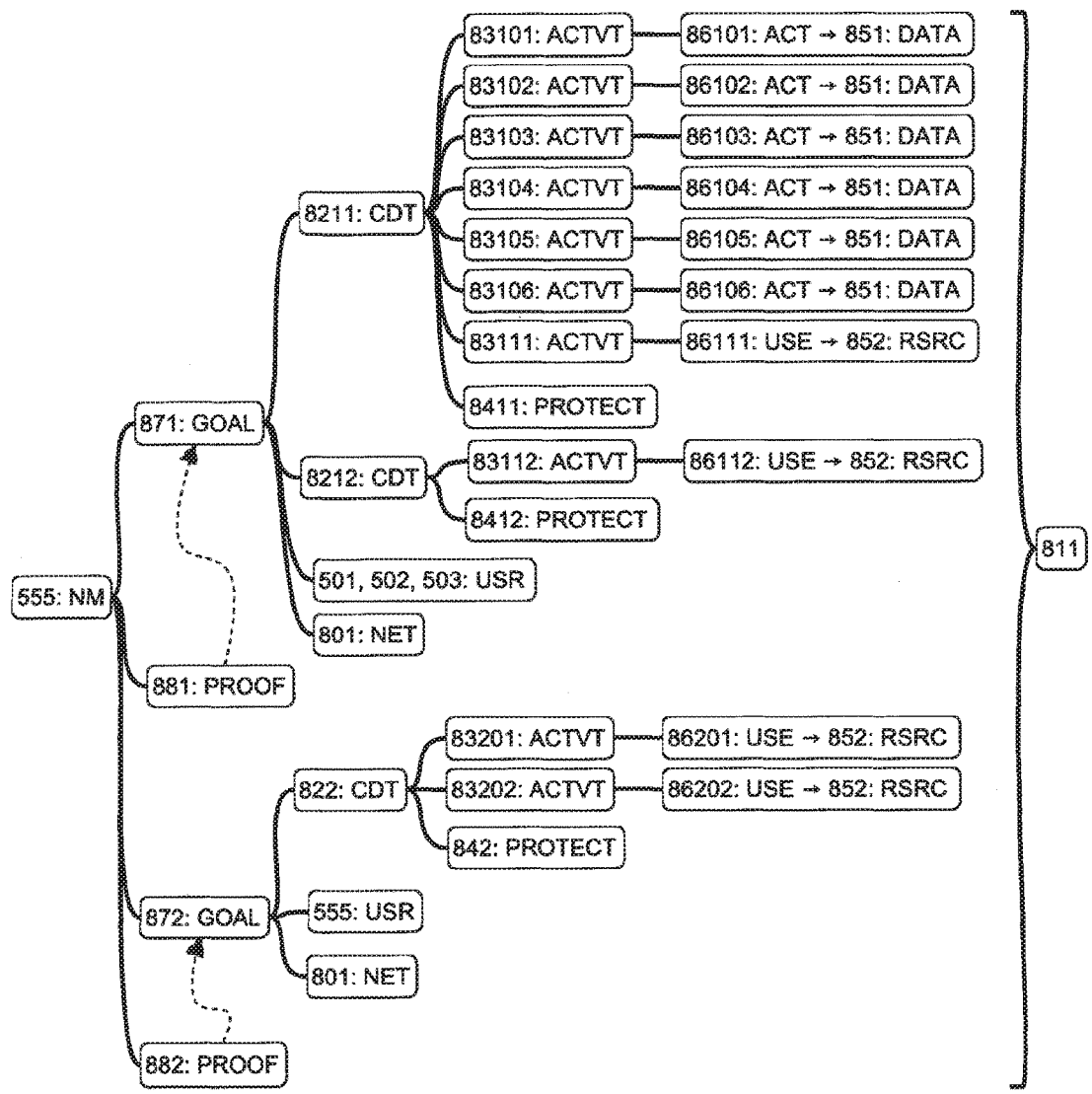
Figure 13:
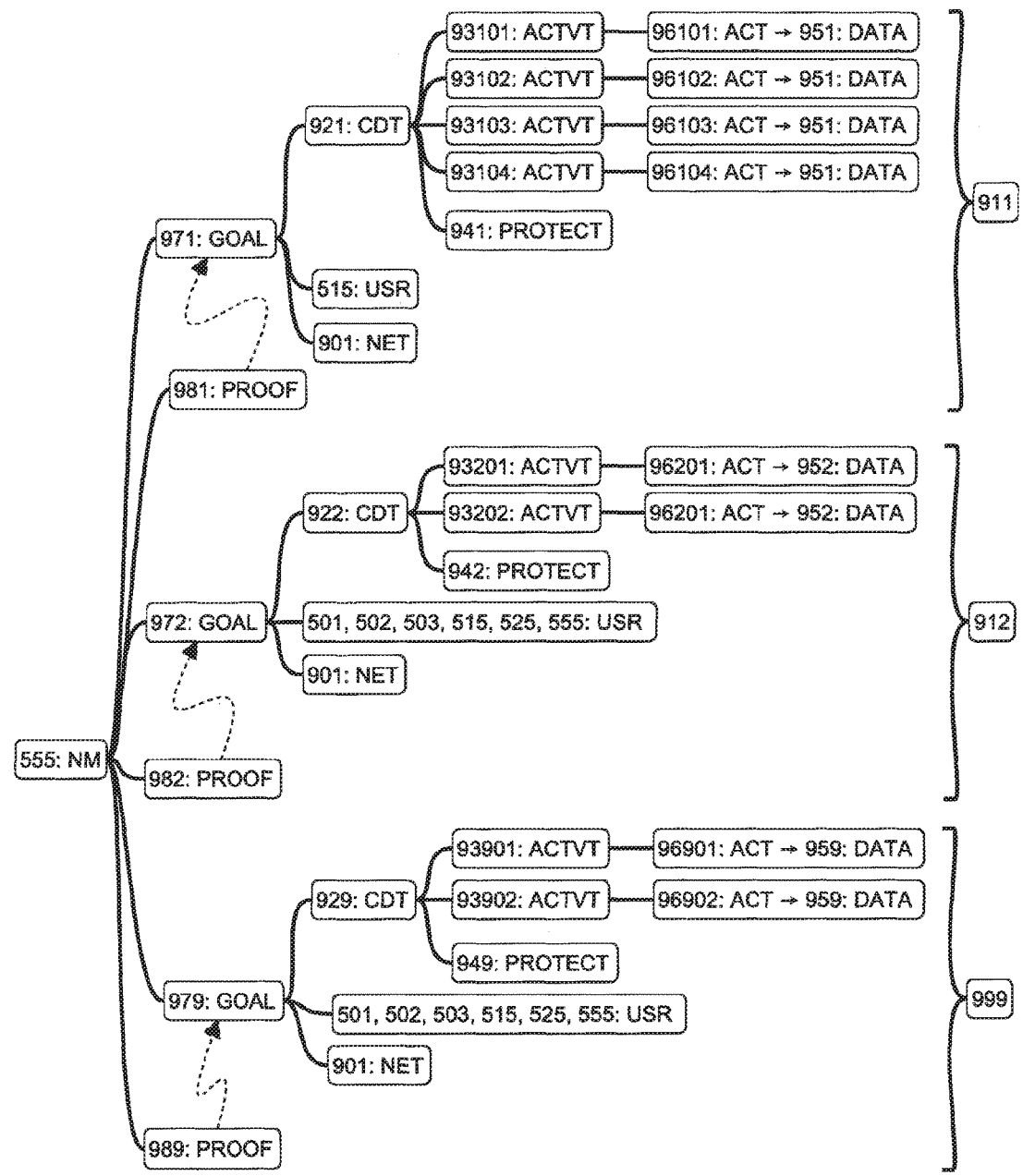

FIG. 12 and FIG. 13 show the logic organization of the formal descriptions of the goals and of the proofs, of one example of using the invention.

DETAILED DESCRIPTION OF PREFERRED EMBODIMENT(S)

A network manager is the representative of an organization and who is responsible for ensuring the security and operation of the networks over which the hardware and software communicate. In the description below, the term NM will be understood as meaning a network manager who uses the invention to obtain strong guarantees and achieve the goals in the networks.

Figure 4:
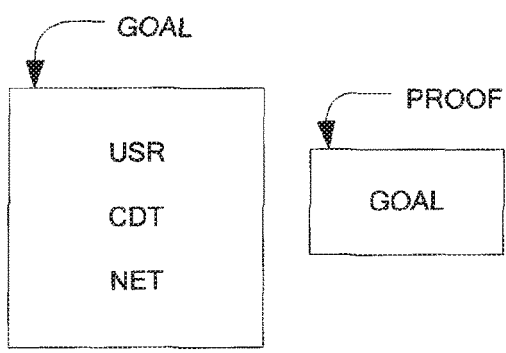

The security goals (FIG. 4, GOAL) differ depending on the network users (FIG. 4, USR). In the description below, the term USR will be understood as meaning an identified user, or a group of identified users, regardless of whether this involves a natural person, a legal person, or a certified communicating device that automatically uses the services of other communicating devices to perform the functions for which it was designed and configured.

Figure 1:
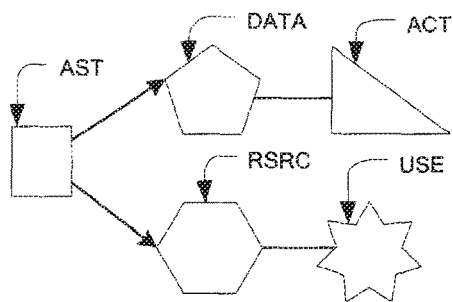
FIG. 1 shows a logic organization of an asset to be protected (AST), which can be a data item (DATA) on which an action (ACT) can be applied, or which can be a resource (RSRC), the use (USE) of which can be made.

According to one embodiment of the invention, FIG. 1 presents the logic organization of an asset to be protected (FIG. 1, AST), which can be a data item (FIG. 1, DATA) onto which an action (FIG. 1, ACT) can be applied, or which can be a resource (FIG. 1, RSRC) that can be used (FIG. 1, USE).

In the description below, the term DATA will be understood as meaning one or more data items, and the term RSRC will be understood as meaning one or more resources.

In the description below, the term ACT will be understood as meaning one or more actions that can be applied to a data item DATA, and the term USE will be understood as meaning one or more uses of a resource RSRC.

In the description below, the term AST will be understood as equally meaning a data item DATA or a resource RSRC.

Figure 2:
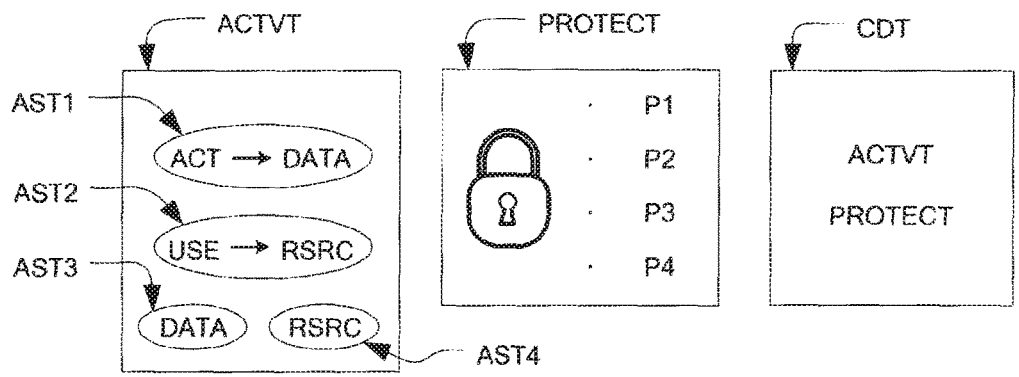
FIG. 2 shows the logic organizations:
of an activity (ACTVT) comprising four assets to be protected (AST1, AST2, AST3, AST4),
of a protection (PROTECT) that includes four security properties: access control (P1), confidentiality (P2), integrity (P3), authenticity (P4);
of a usage condition (CDT) that involves an activity (ACTVT) according to a protection (PROTECT)

According to one embodiment of the invention, FIG. 2 presents the logic organization of an activity (FIG. 2, ACTVT) implemented by the certified communicating devices, which is:

an action ACT applied to a data item DATA (FIG. 2, AST1), the use USE of a resource RSRC (FIG. 2, AST2), a data item DATA without an associated action ACT (FIG. 2, AST3), or a resource RSRC without an associated use USE (FIG. 2, AST4)

The certified communicating devices include activities (ACTVT), the functioning of which changes depending on their configurations. For example, an activity allowing access to a file system can propose all functions of the file system (case No. 1: read, delete, run, create a file or directories, etc.) or be configured to offer limited functions (case No. 2: read and run only for example).

Usefully, the network manager will determine the functions that he/she has use of, indicating the configurations according to which he/she will use the activities (ACTVT) of the certified communicating devices. An activity (ACTVT) whose operational behavior can be modified by its configuration is used to bring about other activities (ACTVT); for example, an activity for accessing a file system, for which two different uses are configured, results in two separate activities (ACTVT) (one for each use).

In the description below, the term ACTVT will be understood as equally meaning:

the formal description of a data item DATA and an associated action ACT, the formal description of a resource RSRC and an associated use USE, the formal description of a data item DATA only, or a resource RSRC only.

An activity ACTVT is the association of an action ACT on a data item DATA, or the use USE of a resource RSRC; therefore, the same resource RSRC, or the same data item DATA, can appear in several activities ACTVT when the associated use USE or action ACT is different.

According to one embodiment of the invention, FIG. 2 presents the logic organization of the protections (FIG. 2, PROTECT) used to describe the expected protections, or to describe the protections provided by the networks and their components.

In the description below, the term PROTECT will be understood as meaning the formal description of the security properties that can be provided or requested to perform an activity ACTVT.

A protection PROTECT comprises one to four security properties from those listed below:
1. Access control (FIG. 2, P1).
2. Confidentiality (FIG. 2, P2).
3. Integrity (FIG. 2, P3).
4. Authenticity (FIG. 2, P4).

According to one embodiment of the invention, FIG. 2 presents the logic organization of a usage condition (FIG. 2, CDT) in which an activity ACTVT must be used in accordance with protections PROTECT.

In the description below, the term CDT will be understood as meaning the formal description of the usage conditions of one or more activities ACTVT for which the protections PROTECT are requested.

The protection PROTECT can indicate that the four security properties must be ensured, however some of the latter may not be required. One condition CDT indicates that an activity ACTVT is free to use if no security property is required.

If the activity ACTVT is a data item DATA only or a resource RSRC only, the condition CDT indicates the protections PROTECT that the device storing the data item DATA, or the resource RSRC must provide, if subjected to external attacks. An external attack is an attempt to penetrate the device, the materialization of which depends on the nature of said device (example: logical attack on a communication protocol to place the device in an unstable state, differential measurement of the device's power consumption to extract secrets, invasive attack altering the device's integrity).

Figure 3:
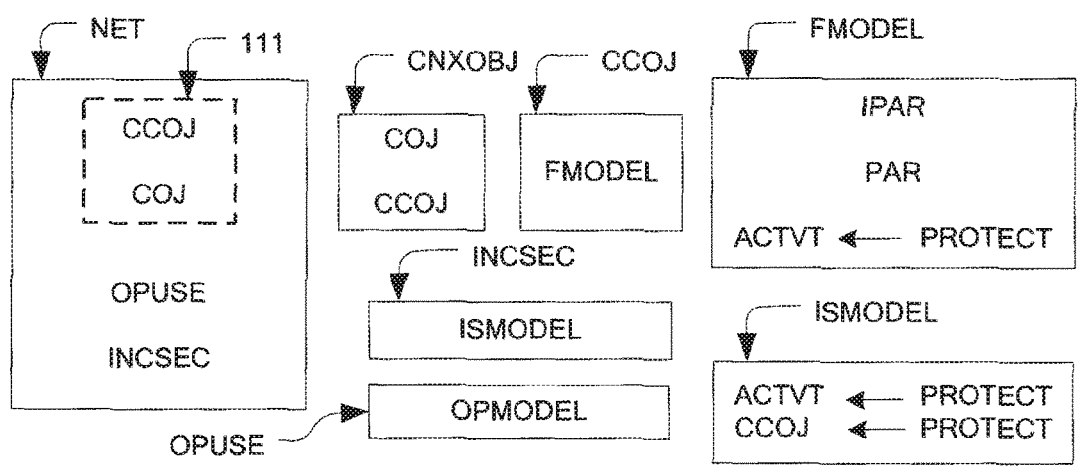
FIG. 3 shows the logic organizations:
of a certified communicating device (CCOJ), the known and guaranteed behavior of which is formally described in a formal model (FMODEL),
of the formal model (FMODEL) of a certified communicating device (CCOJ), that includes initial parameters (IPAR), calculated parameters (PAR) and activities (ACTVT), to which said device provides protections (PROTECT) according to its parameters,
of security properties (INCSEC) formally described in a model (ISMODEL), and that apply unconditionally,
of the formal model (ISMODEL) for security properties (INCSEC), that describes a plurality of protections (PROTECT) from which benefit a plurality of activities (ACTVT), and a plurality of protections (PROTECT) from which benefit a plurality of certified communicating devices (CCOJ).
of a communicating object (CNXOBJ), that includes a plurality of certified communicating devices (CCOJ), and a plurality of ordinary communicating devices (COJ),
of operational restrictions (OPUSE) that are formally described in a formal model (OPMODEL), of a network (NET) that includes a plurality of certified communicating devices (CCOJ) or ordinary communicating devices (COJ), wherein operational restrictions (OPUSE) and security properties (INCSEC) apply.

According to one embodiment of the invention, FIG. 3 presents the logic organization of a communicating hardware or software item (FIG. 3 CNXOBJ), comprising an ordinary communicating device (FIG. 3, COJ) and a certified communicating device (FIG. 3, CCOJ).

In the description below, the term COJ will be understood as meaning an ordinary communicating device, the behavior of which does not need to be guaranteed.

In the description below, the term CNXOBJ will be understood as meaning a hardware or software item that includes one or more certified communicating devices CCOJ, and optionally one or more ordinary communicating devices COJ.

A certified communicating object CNXOBJ can be materialized in multiple ways, such as:

a router, a wireless access point, a company badge reader, a database processing a customer file, without any assumptions being made regarding the size, embodiment or installation of the database, a company that offers big data back-up services for archiving purposes is a certified communicating device, the services of which are drawn up by contract between the parties, a computer server that embeds specialized applications in two independent virtual machines contains two communicating devices (the two virtual machines), a smart card that contains multiple applications is one example of an interconnected object (the smart card) that contains other communicating devices (the applications embedded in the smart card), a specialized software item on a computer server, an operating system, a web browser, a smart phone, a controller or industrial robot, etc.

Among the functions provided by a CNXOBJ, those ensured by the certified communicating devices CCOJ that compose it are guaranteed, and thus are more expensive to perform than those ensured by COJs. Advantageously, the CNXOBJs include certified communicating devices CCOJ and ordinary communicating devices COJ in order to optimize costs while providing sufficient guarantees.

According to one embodiment of the invention, FIG. 3 presents the logic organization of a certified communicating device (FIG. 3, CCOJ), accompanied by its formal description (FIG. 3, FMODEL).

In the description below, the term CCOJ will be understood as meaning a certified communicating device, characterized in that:

the behavior of a CCOJ is known and guaranteed, a CCOJ comprises activities ACTVT to which it provides protections PROTECT depending on its configuration, a CCOJ provides protections PROTECT to the assets AST that it contains, against external attacks, the behavior of a CCOJ is formally described in a model (FIG. 3, FMODEL) that includes, in particular, the activities ACTVT that it proposes and the protections PROTECT that it possesses to protect the activities ACTVT and the assets AST that it contains.

External attacks to which a CCOJ can be subjected depend on the nature and value of the assets AST, and on the communicating object CNXOBJ that comprises the CCOJ. This can, in particular, involve logical attacks, invasive attacks or side channel attacks. A certified communicating device CCOJ is designed to provide protections PROTECT in relation to the attacks to which is can be subjected. Therefore, the CCOJs do not all offer the same levels of protection, and do not all protect against the same attacks; they are designed to suit their uses and the environment in which they are used. Mobile devices, such as a smart card or a mobile phone can be attacked using invasive methods; conversely, a network router installed in a locked room is protected against invasive attacks.

A certified communicating device CCOJ can be connected to one or more networks, over which data is exchanged with other communicating devices.

A certified communicating device CCOJ is accompanied by assurances, the nature and number of which vary. They in particular depend on the operational context, security issues, and the technologies implemented to perform the activities ACTVT. The choice of appropriate assurances for determining that a communicating device is a certified communicating device CCOJ remains the choice of the network manager NM; he/she determines the nature and level of the protections that must be provided in the networks for which he/she is responsible, according to the attacks to which they can be subjected, and the regulations or standards with which he/she must comply.

According to one embodiment of the invention, FIG. 3 presents the logic organization of the formal model (FIG. 3, FMODEL) of a certified communicating device CCOJ.

In the description below, the term FMODEL will be understood as meaning the formal model of a certified communicating device CCOJ, characterized in that:

A formal model FMODEL accurately describes the guaranteed behaviors of its certified communicating device CCOJ.

A formal model FMODEL describes the activities ACTVT proposed by the certified communicating device CCOJ, as well as the protections PROTECT that said device can provide to said activities depending on its parameters.

A formal model FMODEL describes the protections PROTECT that the certified communicating device CCOJ provides to the assets AST that it contains in the event of external attacks, in particular the model FMODEL indicates the nature and level of the external attacks that said device can withstand.

It comprises the formal descriptions of the parameters of the device (FIG. 3, PAR and IPAR), that determine the behavior of its CCOJ, and the protections PROTECT applied to the activities ACTVT.

In the description below, the term PAR will be understood as meaning a parameter of a certified communicating device CCOJ, characterized in that the information contained in said parameter is calculated, and is transmitted to the certified communicating device CCOJ to determine its behavior and the protections PROTECT of its activities.

In the description below, the term IPAR will be understood as meaning a parameter of a certified communicating device CCOJ, characterized in that the information contained in said parameter is used to calculate the parameters PAR.

The initial parameters IPAR are collected and associated to the model FMODEL to constitute an appropriate operational description of the CCOJ to which they correspond before calculating the parameters PAR. If identical CCOJs with the same model FMODEL are used in the networks, the parameters IPAR that are collected from each CCOJ are used by the invention to learn the behavior of each CCOJ individually.

The parameters of the device are indicated in the formal models FMODEL so that the inventive method programs the behavior of each CCOJ by communicating to it the parameters PAR that it has calculated in order to achieve the goals targeted.

The formal description FMODEL of a CCOJ comprises the description of the activities ACTVT that the CCOJ supports, as well as the protections PROTECT that the CCOJ can provide for said activities.

A calculated parameter PAR can replace an initial parameter IPAR in the device CCOJ to which it is transmitted (example: replacement of the factory settings of a product, updating of certificates and cryptographic keys, etc.).

Advantageously, different CCOJs whose guaranteed behaviors are similar can be subject to different formal models FMODEL, however use identical formal description portions derived from electronic libraries, in particular when the services provided by said CCOJs are standardized.

In the models FMODEL, the activities ACTVT and their protections PROTECT are described with indications of the role of the parameters in their functioning. By calculating the appropriate parameters PAR, the inventive method determines the use made of the activities ACTVT for users USR, depending on the protections PROTECT.

If the activity ACTVT includes a data item DATA only or a resource RSRC only, the protection PROTECT designates the security properties that the CCOJ provides in order to store said data item DATA or said resource RSRC, and protect it against external attacks.

According to one embodiment of the invention, FIG. 3 presents the logic organization of the operational restrictions (FIG. 3, OPUSE) that apply to a network (FIG. 3, NET), and that are described in a formal model (FIG. 3, OPMODEL).

The nature of the operational restrictions depends on the communications network and the hardware and software connected to it; such restrictions in particular include:

the communication restrictions linked to the network architectures (wiring, throughput, bandwidth), the ephemeral or persistent nature of a communication channel, the services proposed by the communicating devices and the protocols that they support, the preferences of the network manager in order to, for example, priorities free communication channels, reduce or increase throughput in a given part of the network, communication flows that are implemented in the networks, the preferences of the network managers NM in order to promote the least expensive solutions (such as in the event of the use of charged broadband connections to connect together different sites of the same organization), In the description below, the term OPUSE will be understood as meaning the operational restrictions that apply to a communications network.

In the description below, the term OPMODEL will be understood as meaning a formal model of the operational restrictions OPUSE. The formal descriptions OPMODEL contain information on the network architectures, in particular the hardware and software CNXOBJ that are connected and the communication solutions that exist between them. The ordinary communicating devices COJ do not have any guaranteed characteristics; their formal descriptions are included in the models OPMODEL.

According to one embodiment of the invention, FIG. 3 presents the logic organization of the security properties (FIG. 3, INCSEC) that are unconditionally provided to the communications network (FIG. 3, NET), and that are described in a formal model (FIG. 3, ISMODEL).

In the description below, the term INCSEC will be understood as meaning the security properties that are unconditionally provided in a communications network.

According to one embodiment of the invention, FIG. 3 presents the logic organization of the formal model (FIG. 3, ISODEL) of the security properties INCSEC.

In the description below, the term ISMODEL will be understood as meaning a formal model in which a plurality of activities ACTVT and a plurality of certified communicating devices CCOJ are described, the latter benefiting from a plurality of protections PROTECT, that apply unconditionally to all network users, regardless of the modes of embodiment of said activities and said protections.

A model ISMODEL in particular comprises the protections provided to the devices CCOJ, and to the activities ACTVT, by the environment in which they operate.

According to one embodiment of the invention, FIG. 3 presents a logic organization of a network (FIG. 3, NET), that includes a plurality of certified communicating devices CCOJ and a plurality of ordinary communicating devices COJ, and in which apply operational restrictions OPUSE, and the security properties INCSEC. The certified communicating devices CCOJ and the ordinary communicating devices COJ are portions of a plurality of communicating objects CNXOBJ symbolized by the box with dotted lines (FIG. 3, 111).

In the description below, the term NET will be understood as a communications network comprising communicating devices CCOJ and COJ, and wherein operational restrictions OPUSE and the security properties INCSEC apply.

According to one embodiment of the invention, FIG. 4 presents a goal (FIG. 4, GOAL), as well as a proof (FIG. 4, PROOF) requested in order to obtain the assurance that the goal indicated in said proof has been successfully achieved.

In the description below, the term GOAL will be understood as meaning a goal.

In the description below, the term PROOF will be understood as meaning the proof certifying that a goal GOAL has been achieved.

The description of a goal GOAL indicates the networks NET in which the goal is targeted, and comprises the usage conditions CDT, and the users USR, to which said conditions apply. A condition CDT describes the protections PROTECT to be provided to an activity ACTVT.

The plurality of data DATA, actions ACT, resources RSRC and uses USE are combined to obtain a plurality of activities ACTVT. Advantageously, the techniques of the SDOs used by the application IAS that is presented in the prior art can be used by the devices CCOJ to address the different combinations of protections PROTECT applicable to the activities ACTVT.

According to one embodiment of the invention, FIG. 5 presents an expert system (FIG. 5, SYSXPRT) that communicates with a plurality of certified communicating devices CCOJ (FIG. 5, CCOJ1 to CCOJn).

The network manager NM indicates to the expert system SYSXPRT the networks NET (FIG. 5, NET1 . . . NETn) in which apply the goals GOAL (FIG. 5, GOAL1 . . . GOALn), and requests proofs PROOF (FIG. 5, PROOF1 . . . PROOFn).

In the description below, the term SYSXPRT will be understood as meaning an expert system that calculates the parameters PAR intended for the certified communicating devices CCOJ.

The expert system SYSXPRT collects the initial parameters IPAR (FIG. 5, 1) from the certified communicating devices (CCOJ1 . . . CCOJn) connected to the networks (NET1 . . . NETn).

The expert system SYSXPRT uses the formal models FMODEL, ISMODEL and the initial parameters IPAR to calculate the parameters PAR intended for the certified communicating devices CCOJ in order to achieve the goals targeted (GOAL1 . . . GOALn) and obtain the proofs (PROOF1 . . . PROOFn) expected.

The expert system SYSXPRT transmits (FIG. 5, 2) the parameters PAR that it has calculated to the CCOJs to which they are intended.

In order to obtain the proofs (PROOF1 . . . PROOFn) that the goals (GOAL1 . . . GOALn) have been achieved, the expert system SYSXPRT collects (FIG. 5, 3) seals (FIG. 5, SEAL) delivered by the CCOJs.

In the description below, the term SEAL will be understood as meaning a seal certifying the completion of an activity ACTVT by a certified communicating device CCOJ.

According to one embodiment of the invention, FIG. 6 presents a container CCOJ (FIG. 6, CCOJ10) that encapsulates other CCOJs (FIG. 6, CCOJ101, CCOJ102, CCOJ103) and benefits from the guaranteed characteristics that they provide. The formal model (FIG. 6, FMODEL10) that describes the behavior of the container CCOJ (CCOJ10) benefits from the formal models (FIG. 6, FMODEL101, FMODEL102, FMODEL103) of the encapsulated CCOJs.

Therefore, a software for the electronic signature of documents can use the encapsulation by outsourcing the calculation of the signature to a smart card specially designed for this purpose; it can thus present all or part of the certified characteristics provided by the smart card in its formal model. Software users do not see the smart card, only an electronic signature software capable of delivering qualified signatures at a security level ensured by the smart card. The encapsulation is particularly appropriate when very different technologies are used to provide the guarantees expected with suitable performance levels and costs. The functions, the security of which must be maximal, are performed by certified communicating devices guaranteed by an independent security evaluation (example: by using the Common Criteria as indicated in the prior art), the other functions are implemented using less expensive technology that provides fewer guarantees.

According to one embodiment of the invention, FIG. 7 presents the logic organization of a master CCOJ (FIG. 7, CCOJ20), the behavior of which is described in a formal model (FIG. 7, FMODEL20). Among the functions (FIG. 7, 20) included in the master CCOJ (CCOJ20), some (FIG. 7, 201, 202, 203) can be used separately; they are described in other models FMODEL (FIG. 7, FMODEL201, FMODEL202, FMODEL203) in which the functions (201, 202, 203) are included for marketing, commercial or technical purposes.

The formal models FMODEL201, FMODEL202, FMODEL203 describe the behaviors of the slave CCOJs (FIG. 7, CCOJ201, CCOJ202, CCOJ203), without said slave CCOJs existing independently from the master certified communicating device CCOJ20. When a user uses one of the slave certified communicating devices CCOJ201, CCOJ202, CCOJ203, the master object CCOJ20 is operated without the user being aware thereof. This allows several service offers (20, 201, 202, 203) to be made using the same device CCOJ20.

Advantageously, a certified communicating device CCOJ, the functions of which have been restricted before delivery for marketing or commercial reasons, will be accompanied by a model FMODEL that takes into account these voluntary restrictions. A customer C1 that chooses an "advanced electronic signature" offer will receive a formal model, the guarantees and the corresponding CCOJ of this offer, another customer C2 that chooses the "standard electronic signature" offer will receive another formal model and lesser guarantees, however the same product with a different set-up. Thus, the CCOJ delivered to the customers C1 and C2 are identical, however they are set up differently; only C1 can declare to have the "advanced signatures" as he/she has the CCOJ with the right set-up.

Advantageously, an organization or a company can use the invention to propose different marketing and commercial offers using the same certified communicating devices CCOJ. It builds the offers using CCOJs capable of performing functions with higher security levels, by proposing two service categories: "services with high security" and "services with standard security". It defines users USR1 for the "services with high security" offer and users USR2 for the "services with standard security" offer. The users USR1 and the users USR2 have access to different activities ACTVT according to the usage conditions CDT defined when describing the goals GOAL. The activities ACTVT deliver results and seals SEAL, the technical characteristics of which correspond to the services of the user USR1 or USR2 (for example the cryptographic calculations used for the "services with high security" use longer keys and stronger algorithms that for the "services with standard security").

By extension, the organization can organize the set of activities ACTVT available to the CCOJs of its networks NET to build a plurality of commercial and marketing offers according to multiple and varied criteria. It can use the invention to control access to all activities and thus authorize or prohibit the use of functions depending on the users.

According to one embodiment of the invention, FIG. 8 presents a goal GOAL (FIG. 8, 73) for which the condition CDT references an activity ACTVT (FIG. 8, ACTVT311), and a proof PROOF (FIG. 8, 74) to certify that the goal GOAL (73) has been achieved.

The activity ACTVT311 is proposed by a CCOJ (FIG. 8, CCOJ31) which uses two other activities ACTVT (FIG. 8, ACTVT321, ACTVT322) of another CCOJ (FIG. 8, CCOJ32), as the device CCOJ31 does not include all of the functions required to complete the activity ACTVT311.

The user calls (FIG. 8, 41) on the activity ACTVT311 of the communicating device CCOJ31. The communicating device CCOJ31 calls (FIG. 8, 51) on the activities ACTVT321 and ACTVT322 of the communicating device CCOJ32, which communicates (FIG. 8, 52) the results of the activities, as well as the seals SEAL (FIG. 8, SEAL321, SEAL322) that certify the performance thereof.

The device CCOJ31 checks the seals SEAL321 and SEAL322, then continues to perform the activity ACTVT311, after which it delivers the results and a seal SEAL (FIG. 8, SEAL311) that certifies the performance of the activity ACTVT311.

The device CCOJ31 is designed to deliver the seal SEAL311 if all of the mandatory operations for completion of the activity ACTVT311 are completed, which is why it checks the seals SEAL321 and SEAL322 before completing the activity ACTVT311. The devices CCOJ31 and CCOJ32 are certified communicating devices CCOJ, the behavior of which is programmed by transmitting to them the parameters PAR calculated according to the invention, which guarantees that the activities executed perform the expected operations. Consequently, the delivery (FIG. 8, 61) of the seal SEAL311 guarantees the performance of the activities ACTVT311, ACTVT321 and ACTVT322.

The proof PROOF (74) is provided by associating the seal SEAL311 with other seals that certify the authenticity and configuration of the devices CCOJ31 and CCOJ32.

Advantageously, the object CCOJ32 can produce a plurality of additional seals SEAL when performing the activities ACTVT321 or ACTVT322 to certify the performance of intermediate operations corresponding to activities ACTVT that are useful for other goals GOAL. A CCOJ can, depending on its programming, store or deliver the seals SEAL that it produces during an activity ACTVT. For example, a sale on a website requires multiple operations, in particular the acceptance of the conditions of sale by the customer, the validation of the online payment that is performed by a trusted third party, and the confirmation of the sale for the shipping service. The first two activities (validation of the conditions of sale and confirmation of the payment) have a legal or financial impact for which a proof PROOF obtained using additional seals SEAL is useful. In order to guarantee that the communication of said additional seals is verified, specific activities ACTVT can be included in the CCOJs during their design.

Advantageously, a seal SEAL provides guarantees on selected portions of an activity ACTVT, whereas the other portions are ignored. This helps simplify the generation of seals SEAL, and improve the performances of the communicating devices CCOJ. Therefore, when a bank payment authorization server is used, the critical portion in particular comprises the acceptance or refusal of the authorization and the generation of a certificate communicating the response. There is no need to certify the performance of all other portions of activity such as the communication protocols, the syntactic analysis of the order, the construction of the response message, etc.

According to another embodiment of the invention, the seals SEAL321 and SEAL322 are not verified by the communicating device CCOJ31, but are delivered (FIG. 8, 62) in the same manner (61) as for the seal SEAL311. The presence of the three seals SEAL311, SEAL321 and SEAL322, certifies that the activity ACTVT311 took place normally.

FIG. 9 presents a plurality of certified communicating devices CCOJ (FIG. 9, CCOJ1 . . . CCOJn), the activities ACTVT of which produce (FIG. 9, 80) a plurality of seals SEAL (FIG. 9, SEAL1 . . . SEALm), which are combined (FIG. 9, 90) to build a plurality of proofs PROOF (FIG. 9, PROOF1 . . . PROOFq) certifying that the goals GOAL have been achieved. A seal can be used to build multiple proofs.

The commands available to use a communicating object CNXOBJ depend on its nature; in most cases they call on communicating devices COJ and CCOJ that are included in the CNXOBJ. The portions that do not handle the assets AST without protection, such as the network layer of the model OSI, are operated by the COJs. The portions that play an active role on the protections PROTECT of the assets AST are implemented by the activities ACTVT of the CCOJs.

According to one embodiment of the invention, an Ethernet hub is a communicating object CNXOBJ that only comprises communicating devices COJ, as its role is to repeat the data packets that it receives over all of its communication ports without the modification thereof.

According to one embodiment of the invention, a router capable of sending communications over its Ethernet ports, and over a wireless Wi-Fi interface, is a communicating object CNXOBJ that comprises COJs and CCOJs. The portion responsible for the Wi-Fi interface ensures the confidentiality of the data exchanged according to a configured encryption mode and key; these services are implemented by the CCOJs of the router, which encrypt and decrypt on-the-fly the data exchanged with the wireless peripherals. The communications that use Ethernet cables are provided by the COJs of the router.

The means implemented to provide the assurances on the behavior of a certified communicating device CCOJ do not systematically involve an in-depth technical assessment (as is the case for the Common Criteria certifications specified in the prior art). Therefore, the audit of the computer facilities of a company by a qualified expert could be considered to be sufficient assurance.

The network manager NM determines whether he/she has sufficient guarantees to consider that a communicating device and its formal description FMODEL constitute a certified communicating device CCOJ.

In many cases, a device CCOJ must be customized before being implemented in the networks NET. Cryptographic keys or passwords to securely communicate with the CCOJ are defined; this operation takes place in a controlled environment (manufacturing plant for smart cards, network technician room for routers, web servers or firewalls, etc.).

Advantageously, the CCOJs include commands whose activities ACTVT allow for the customization of the assets AST that contain the initial cryptographic keys or passwords. At this time, other assets AST are customized to identify the keys and passwords of the CCOJ, without revealing their secret values.

The initial parameters IPAR and the calculated parameters PAR are assets AST, and the devices CCOJ include activities ACTVT to ensure their protection, in particular when they are exchanged with the expert system SYSXPRT. Preferably, at least the integrity and authenticity of the parameters IPAR and PAR are protected in order to guarantee that the calculations are performed with the correct parameters IPAR, and that the devices CCOJ use the parameters PAR calculated by the expert system.

The parameters IPAR and PAR contain information that determines the behavior and the active protections of the CCOJs. They mainly contain:

The descriptions of the users USR of the CCOJs.

The descriptions of the protections PROTECT to be implemented for the activities ACTVT according to the users USR.

The descriptions of the seals SEAL that the activities ACTVT deliver (according to the capabilities of each activity).

The operational parameters of the activities ACTVT, in order to customize their actions according to the needs.

Advantageously, the devices CCOJ memories the established protections PROTECT to use them multiple times. Therefore, when a user presents his/her secret code to a smart card, the latter records the information until it is powered down, which opens access to all of the activities dependent on the presentation of said code.

Advantageously, the CCOJs establish secure communication channels that provide the properties PROTECT necessary for exchanging information over the networks. Depending on the needs, the secure communication channels can be established upon activation of the CCOJs, or be maintained, regardless of whether frequent use is made thereof, or be established when necessary then disappear after the command using them is complete.

A device CCOJ provides its functions, while protecting the data DATA and resources RSRC, to which it provides the protections PROTECT for which it was designed and configured.

For example, during secure exchanges between two computers according to the TCP/IP protocol, the network layer IP is responsible for transmitting the data, however does not play a part in its protections. It is the application layer, or presentation later, that is often responsible for the security of communications; it is therefore in this communication layer that the data encryption and decryption activities are implemented.

Advantageously, the CCOJs comprise a plurality of communication protocols and cryptographic algorithms that support the four security properties of the protections PROTECT. The four security properties are implemented and standardized in different manners depending on the technical environments. For a smart card that has little memory RAM, the data is exchanged in small quantities, whereas a microcomputer has enough memory and power to handle a large volume of information. In both cases, secure communication channels are used, in which the data is encrypted from beginning to end, however according to standards adapted to suit the use cases. Some technologies are adapted to suit a specific use case but not another, for example a "challenge/response" authentication is adapted to suit a calculation performed by a machine, whereas a secret code input on a dedicated keyboard is better suited to authenticate a human user.

Advantageously, the CCOJs propose functions to provide the access control for activities ACTVT, including:
the input of a secret code or password,
the verification of a biometric data item,
the authentication of a hardware item by generating a unique challenge that it must use to calculate a cryptogram that will be verified by the challenge transmitter (method referred to as the "challenge/response" method), The technologies can be sequenced in order to propagate a security property between the CCOJs. When a human user USR authenticates himself/herself to a smart card, the activities ACTVT made available in said card can run a cryptographic authentication with another CCOJ, which enables the propagation of the authenticated "human user" property.

Advantageously, the CCOJs propose functions to ensure the confidentiality of the assets AST, including:
the creation of secure communication channels over which the encrypted data is transmitted,
the storage of assets in a protected environment, such as the storage of data in a controlled enclosure (building under surveillance) without the technical possibility of their recovery without having physical access to the storage medium.

Advantageously, the CCOJs propose functions to ensure the integrity of the assets AST, including:
the calculation and verification of an integrity control code for the data exchanged between devices,
the duplication of said data and the periodic verification of its integrity in order to be able to correct altered information.

Advantageously, the CCOJs propose functions to ensure the authenticity of the assets AST, including:
the calculation of an electronic signature that can be verified by a third party,
the storage of the assets in an environment protected from identified threats.

When an encrypted data item is transmitted over a network NET, its confidentiality is ensured by the cryptography. When it is received, the activity ACTVT that processes it, decrypts the cryptogram and obtains the initial data item. The confidentiality of the data item is thus ensured by the CCOJ that bears the activity that decrypted it.

The formal models of the communicating devices CCOJ describe the security properties available to provide the protections PROTECT, and indicate which technologies and which standards are implemented to provide said protections.

The format of a data item DATA is not limited. This can be a bit, a figure, a complex assembly of structured information such as a database, or an SDO specified in the prior art. The actions ACT that apply on the data DATA depend on the natures of said data items, and on the functions that use them.

The following non-exhaustive list presents the possible actions ACT:

Generating data: such as the processing of databases to generate other data useful for other processing operations, in particular statistics, or a mathematical calculation to generate an RSA key pair.

Verifying data: such as a cross-check, or integrity check.

Receiving data: such as the preparation of an acknowledgement of receipt.

Transmitting data: such as the transmission of an acknowledgement of receipt.

Storing data: such as the saving of information on separate physical media to ensure that a copy is always available.

Using data: such as the processing of databases for marketing purposes.

Reading data: such as access to a file containing confidential information.

Writing data: such as the creation of a file, or the addition of information in another.

Modifying data: such as the replacement of an information item by another.

Duplicating data: such as the copying of a file.

Destroying data: such as the deletion of a file.

Authenticating a user: such as the verification of passwords on a PC, the verification of a secret code on a smart card, or the authentication of a CCOJ with regard to another CCOJ thanks to the cryptography.

Reading a parameter: such as the reading of the parameters IPAR of the CCOJs.

Writing a parameter: such as the writing of the calculated parameters PAR in the CCOJs.

Upgrading the software: such as the modification, addition or deletion of portions of communicating objects CCOJ.

Verifying the integrity: such as the periodic verification of the integrity of a data item.

The resources RSRC are services proposed by the CCOJ, from whose uses USE value is drawn. A resource RSRC can in particular be:
- the time of use of a function,
- the sum of all energies consumed to perform the service,
- the sum of all expenses incurred to provide the service,
- the performance of an identified task,
- the combination of multiple services, such as the performance of an identified task, which is invoiced at an amount X, plus the sum of all of the energies consumed to perform the task, which is invoiced at an amount Y.

A resource RSRC can be subject to a use USE that can in particular be:
- the usage metering to calculate the remuneration to be invoiced to the user USR,
- the limitation of the use to a predetermined threshold for prepayments and fixed uses with a maximum threshold,
- the monitoring of the use for accounting, statistic or archiving purposes.

Advantageously, the CCOJs communicate with each other and together take part in delivering RSRCs to the same users USR. Therefore a CCOJ can propose the use USE of a resource RSRC against a remuneration (money, "resource points" used to access resources from other CCOJs, etc.). Advantageously, an internet server proposes a catalogue of resources RSRC in which the remuneration to be made for each use USE of a resource RSRC is indicated.

The uses USE are subject to remunerations which vary depending on miscellaneous criteria such as: the type of object CCOJ that delivers or uses the resource, the moment at which the resource is used, the place at which the resource is used, etc. Therefore, the provision of electrical energy can be used in a different manner depending on whether it supplies a motor vehicle or a home. International studies show that access to energy will be problematic on the African continent in 2017, in particular due to a lack of power distribution infrastructures. Advantageously, the invention can be used to share the power stored in the batteries of mobile appliances by proposing it in the form of resources RSRC, the uses USE of which will meet the needs.

The expert system SYSXPRT uses the formal descriptions of users and of systems of varied natures to perform calculations and transmit data with the purpose of achieving the goals. In the description below, the term ARTEFACT will be understood as meaning the formal description of any person, hardware, software, or method (such as an authentication method using cryptography), that is used according to an embodiment of the invention. In particular, the term ARTEFACT equally describes an asset AST, a data item DATA, an action ACT, a resource RSRC, a use USE, an activity ACTVT, a protection PROTECT, a user USR, a condition CDT, a goal GOAL, a proof PROOF, a seal SEAL, a model FMODEL, a model OPMODEL, a model ISMODEL, an initial parameter IPAR, or a calculated parameter PAR.

The ARTEFACTs are useful for describing the networks NET, and for describing the goals GOAL and the proofs PROOF chosen by the network managers NM. They belong to two categories:

1. The ARTEFACTS that provide the expert system SYSXPRT with the guaranteed information required to perform the operations enabling the goals GOAL to be achieved and the proofs PROOF to be obtained.

2. The ARTEFACTS that provide the expert system SYSXPRT with the non-guaranteed information, in particular that regarding the operation of the networks and their components (communication protocols, nature of the communication channels, non-guaranteed characteristics of the CNXOBJs, etc.).

The network managers NM determine whether a formal description constitutes a guaranteed ARTEFACT or a non-guaranteed ARTEFACT.

The following formal descriptions are guaranteed ARTEFACTs:
FMODEL, ISMODEL, GOAL, USR, CDT, PROOF, IPAR, PAR, SEAL, AST, DATA, ACT, RSRC, USE, PROTECT, ACTVT.

The formal description OPMODEL is a non-guaranteed ARTEFACT.

The devices CNXOBJ are designed such that the functions whose use is to be controlled are activities ACTVT proposed by its CCOJs, whereas the other functions are performed by its COJs. For example, a secure fingerprint reader is a CNXOBJ that includes COJs to carry out the communications with a server, display messages on a screen, etc., and CCOJs which read the fingerprints and protect them before they are transmitted to the server by the COJs.

The formal descriptions of the ARTEFACTs are constituted from imperative expressions and declarative expressions. Advantageously, the Backus-Naur Form is used to define a common language for describing the ARTEFACTs useful for implementing the invention. Advantageously, the network managers NM, the manufacturers of communicating objects CNXOBJ and of expert systems SYSXPRT, the users of the networks, etc., work with each other via standardization bodies (such as ISO, ETSI or W3C) to define a formal grammar useful for the imperative or declarative description of an ARTEFACT.

Advantageously, this common grammar is in particular used to describe:
- the conditions to be met to access an asset depending on the use made thereof,
- the properties that must be guaranteed on this asset (access control, confidentiality, integrity, authenticity),
- the most common actions when the asset is a data item (reading, writing, deleting a data item, etc.),
- the uses that correspond to the asset when this is a resource (limited use depending on a cost or a power consumption, counting of the machine time used on a shared hardware item, etc.),
- the means for managing the access conditions, confidentiality, integrity, authenticity of the assets AST and of the activities ACTVT (encoding of access rights, cryptographic algorithms, PKI architecture and certification authorities, etc.),
- the means for generating and delivering seals designed to establish proofs (calculation of an electronic signature, triggering of an electric signal, etc.),
- the assets of shared use in the electronic exchanges, such as payment transactions, invoices and of their components, accounting items, codes and passwords used to authenticate the users.

The use of declarative expressions is particularly appropriate when the exact nature or number of the ARTEFACTs are not yet known.

Advantageously, this common grammar is used to compare the intrinsic security of the elements described, according to the security properties of the protections PROTECT.

When the network manager NM describes the users USR of the networks, the use of declarative expressions allows him/her to specify characteristics of the users USR, the number of which may vary; typically, the network manager NM describes the users via their roles within the organization (R&D electronic engineer in the telecommunications department, staff of the marketing and strategy team, administrative accounting staff, sales manager, chief executive officer, etc.). The principle is the same when users are certified communicating devices CCOJ that use other CCOJs.

Advantageously, the ARTEFACTs that describe the users and the means for controlling access to the activities allow for the identification and authentication of said users; when the activities concern resources RSRC, the ARTEFACTs include non-repudiation functions so that the users cannot dispute the use of said resources.

Advantageously, a CCOJx1 authenticating itself to another CCOJx2 can indicate the human user USR on behalf of whom it wants to use an activity ACTVT, then the CCOJx2 invoked can manage the access control to said activity according to the communicating device CCOJx1 that emits the request and depending on the human user at the origin of the request.

Several solutions can be used to allow a CCOJ to authenticate itself to another CCOJ:

the CCOJs are customized such that the possible communications with other CCOJs are all programmed (centralized management), the CCOJs inform each other of their capacities, in particular they inform each other of the activities ACTVT that they propose and of the protections PROTECT that they provide for said activities (decentralized management).

The protections PROTECT provided by a CCOJ guarantee the access control, integrity, authenticity and confidentiality of the activities ACTVT of the CCOJ; the usage conditions CDT describe the protections PROTECT requested for the activities ACTVT. Each security property can be implemented in multiple ways, and according to different levels of protection. An access control using a password offers a lesser protection than a cryptographic challenge/response-based authentication. Advantageously, the formal descriptions use a common grammar comprising declarative expressions, that are used to express the levels of protections PROTECT, and to compare the protections provided with those requested, without describing in detail the modes of implementation. This common grammar is used to produce the ARTEFACTs according to national and international standards; the "General Security Referential" (RGS) published by ANSSI can be used to build this common grammar.

The use of imperative expressions is appropriate when the protection PROTECT, or the activity ACTVT is implemented according to technical means specified in a standard or a reference document, the use of which is imperative.

The use of declarative expressions is appropriate when the technical solutions implemented do not require indicating. Therefore, when a certified communicating device CCOJ is approved to comply with the RGS, its formal model FMODEL indicates this, via the common formal grammar. Advantageously, two different communicating devices CCOJ that are both RGS-approved, can provide suitable protections PROTECT, and propose similar activities ACTVT, however according to different implementations.

If an activity ACTVT is a data item DATA only, or a resources RSRC only, the protections PROTECT that the CCOJ provides to the activity ACTVT describe the capacities of the CCOJ to guarantee the four basic security properties if it is subjected to external attacks. Advantageously, the common grammar is used to describe the attacks to which the CCOJs can be subjected, in particular the logical attacks, invasive attacks, or side channel attacks, and is also used to rate the attacks (for example according to a method similar to that of the "Joint Interpretation Library/Application of Attack Potential to Smartcards").

If the certainties required are very high and if they require the evaluation of products connected to the networks by independent laboratories (example: Common Criteria evaluation), the models FMODEL and ISMODEL are signed by said laboratories with cryptographic tools. This enables the authenticity of the formal models used for the calculations to be checked; similarly, the certified communicating devices CCOJ comprise cryptographic functions that ensure their characteristics remotely (brand, model, version, etc.).

Advantageously, the certified communicating devices CCOJ comprise a plurality of activities ACTVT, the role of which is to establish and verify the protections PROTECT of the CCOJs. They are used in particular to perform the following operations:

Authentication of a user USR by checking his/her password.

Authentication of a user USR via a cryptographic means and establishment of a secure communication channel guaranteeing the confidentiality, integrity and authenticity of the information flowing through said channel.

These activities are those used at first, as they open up the use of other activities ACTVT of the CCOJ by establishing the conditions CDT defined in the goals GOAL.

The security properties INCSEC that are unconditionally available in a communications network provide protections PROTECT to the devices CCOJ and to the activities ACTVT. Thus, the devices CCOJ installed in a locked room benefit from the access control and integrity of said room. If an activity ACTVT of a device CCOJ is operated from a console that is locked by a padlock, it benefits from the access control of said console, whereas the other activities ACTVT of the same device that do not require the use of said console do not benefit therefrom. The security properties INCSEC can be implemented by communicating devices. Thus, a communication channel between two establishments of an organization, whose exchanges are protected using encrypting devices, comprises security properties INCSEC.

According to one embodiment of the invention, a certified communicating device CCOJ comprises functions to replace, modify or add parts of the CCOJ; they are used to transmit portions of software, and take into account the hardware modifications of the CCOJ (addition, replacement or removal of an electronic board for example). The CCOJ comprises specialized activities ACTVT that allow for the changing of its software, the detection of modifications to hardware portions taking place in the activities ACTVT, while guaranteeing the protections PROTECT for which it was designed and configured.

The portions of CCOJ that can be modified are its activities ACTVT, or CCOJs encapsulated in a container CCOJ (such as the device CCOJ10 shown in FIG. 6).

When an activity ACTVT or an encapsulated CCOJ is added, removed or modified, the characteristics of the CCOJ change. The changes are echoed on the ARTEFACTs of the CCOJ in the expert system SYSXPRT, so that the future calculations use correct information. Advantageously, the CCOJs track in parameters IPAR all changes to activities ACTVT, and encapsulated CCOJs, using unique version numbers and references, which are collected by the expert system SYSXPRT.

A smart card equipped with a JavaCard virtual machine is a container CCOJ, the applets of which are the encapsulated CCOJs. Advantageously, the encapsulated CCOJs benefit from the protections PROTECT of the smart card against known attacks (in particular certain invasive or side-channel attacks). A new applet can provide activities ACTVT from which the others benefit (using the standardized JavaCard "shareable interfaces" technique.

The invention implements an expert system SYSXPRT that uses ARTEFACTs and calculates parameters for the certified communicating devices CCOJ in order to achieve the goals GOAL, and obtain proofs PROOF.

The expert system SYSXPRT acquires the architecture of the networks NET by means of the models OPMODEL. The models FMODEL and ISMODEL allow for the identification of the assets AST and the activities ACTVT that are supported by the devices they describe. Advantageously, the certified communicating devices CCOJ comprise their own model FMODEL that the expert system SYSXPRT collects from said devices, with the parameters IPAR; in order to ensure the authenticity of the information, the cryptographic keys required to authenticate the CCOJs and their models FMODEL are communicated to the expert system.

Advantageously, the expert system presents a view of the architecture of the networks in which appear the assets AST originating from the recovery of the parameters IPAR as well as the CCOJs, and the CNXOBJs, that carry them. The view of the architecture of the networks also shows the activities ACTVT of the CCOJs and their protections PROTECT, as well as the authorized users USR (for example after a former configuration of the CCOJs with the expert system); in parallel, it shows the activities ACTVT and the protections PROTECT that are not yet configured (therefore that are available for use in the future). In order for the network manager to be able to use the expert system SYSXPRT without worrying about formal descriptions, or protection levels that are available or that must be requested, the expert system will preferably present to him/her the protections, depending on the operational possibilities that they comprise, according to the standardized indicators built based on reference documents (such as the RGS).

In order to define the goals GOAL and the proofs PROOF, the network manager NM selects the operational function for which he/she defines users USR and protections PROTECT. The expert system SYSXPRT interacts with the network manager via a graphical user interface so that the network manager does not have to handle the certified communicating devices CCOJ, or activities ACTVT, that are used to meet the operational request, while guaranteeing the required protection level.

Usefully, the expert system presents the possibilities offered to the network manager while avoiding showing technical details, and by simplifying the choices as far as possible; the goals GOAL that result from the choices made by the network manager preferably use declarative expressions in order to be independent from the technical solutions implemented.

The network manager NM can also choose options that force him/her to imperatively use certain technologies instead of others, certain functions or hardware instead of others, or to encourage less expensive solutions (such as in the case of using charged broadband connections to connected different sites of the same organization); the goals GOAL that result from the imperative choices use the corresponding imperative expressions.

The expert system SYSPRT ensures that the network manager makes all choices that are essential for the definition of the goals GOAL. It also ensures that the network manager indicates the proofs PROOF that he/she desires.

The expert system SYSXPRT, and its graphical user interface, are designed to operate with communicating devices of varying natures. In order to adapt to the various environments, the expert system SYSXPRT is available in multiple versions, for which the user interface, the communications interfaces and additional functions are designed according to the communicating objects, their communicating devices, and their usage environments.

If the calculations performed by the expert system SYSXPRT do not allow the goals GOAL to be achieved, or do not allow the proofs PROOF to be delivered, the expert system SYSXPRT indicates this to the network manager NM. Advantageously, the expert system SYSXPRT indicates the reasons that prevent the desired result from being obtained, and proposes to modify the configuration of the networks, or proposes to modify the goals. If the certified communicating devices CCOJ allow this, the expert system SYSXPRT upgrades them via remote transmission, by changing their activities ACTVT or their encapsulated CCOJs, with the aim of providing the activities ACTVT that present the operational or security elements that are missing. If upgrades to the CCOJ by remote transmission are not possible, the expert system SYSXPRT indicates to the network manager NM the impossibilities that it has discovered, or the modifications to be made in the networks NET to overcome these (for example, modify the hardware). If the certified communicating devices CCOJ do not have sufficient intrinsic security to protect the assets AST that they must handle, the expert system SYSXPRT indicates the modifications to be made to the environments in which operate the communicating objects CNXOBJ that encompass said CCOJs (for example: "place the router in a locked room to prevent any unauthorized handling of the device").

According to one embodiment of the invention, the expert system SYSXPRT comprises multiple specialized sub-assemblies. The most sensitive functions, in particular the calculations that use the guaranteed ARTEFACTs, are entrusted to trusted sub-assemblies designed with the help of a proof assistant. The other functions, such as the user interfaces and the communications protocols, are entrusted to other sub-assemblies that allow for the invention to be used for varied technical fields and environments. Advantageously, the sub-assemblies that constitute the expert system SYSXPRT are sorted according to the importance of the functions that they perform in order to meet the expectations of the network manager NM. The functions that provide the ARTEFACTs (such as the descriptions FMODEL, ISMODEL and OPMODEL) to the expert system SYSXPRT, the functions that ensure the protections PROTECT of the ARTEFACTs exchanged between the expert system SYSXPRT and the certified communicating devices CCOJ, and the functions that perform the calculations, are the most important for providing the guarantees requested. The functions that provide the interfaces with other elements in the network, such as the integrated management software packages or specific equipment, or that have no direct influence on the guarantees provided by the invention, are less critical.

In order to perform the calculations, the expert system SYSXPRT uses the ARTEFACTs that describe the elements of the networks NET, the goals GOAL and the proofs PROOF.

In order to learn the behavior of a CCOJ, the expert system SYSXPRT must have its description FMODEL and its parameters IPAR that it collects from the CCOJs. In order for the parameters IPAR to be those expected, the communications with the CCOJs are protected.

The expert system SYSXPRT uses the models ISMODEL to learn the activities ACTVT and the devices CCOJ that unconditionally benefit from protections PROTECT, and under what conditions (what parts of the networks, what communication channels, what devices, etc.).

The expert system SYSXPRT uses the models OPMODEL to know the means available to it to communicate with the communicating objects CNXOBJ (therefore with the CCOJs and COJs), and the operational restrictions for using them (in particular the connections available and the capacities of the devices).

The expert system SYSXPRT calculates the parameters PAR that allow the goals GOAL to be achieved and the requested proofs PROOF to be obtained, then transmits them to the certified communicating devices CCOJ.

If the unconditional properties INCSEC do not provide the protections PROTECT required to collect the initial parameters IPAR or transmit the calculated parameters PAR, the network manager NM intervenes by transmitting to the expert system SYSXPRT the essential initial parameters IPAR (typically cryptographic keys and passwords) so that the expert system uses the activities ACTVT to obtain the remaining initial parameters IPAR and transmit the calculated parameters PAR while providing the desired protections PROTECT. Advantageously, the certified communicating devices CCOJ have functions that are specially designed for their commissioning, and to define their initial parameters IPAR essential for communicating with the expert system. The functions to be used for their first set-ups are open for use, and the parameters loaded at this time define the initial access conditions to be complied with. Depending on the expected level of security, the use of functions open for use to set up the certified communicating devices takes place in an environment that provides the required security properties PROTECT.

The expert system SYSXPRT uses the activities ACTVT to transmit the calculated parameters PAR while providing the protections PROTECT that guarantee that the correct parameters PAR are transmitted to the CCOJs.

In order to establish the proofs PROOF requested by the network manager NM, the devices CCOJ deliver seals SEAL that guarantee that the activities ACTVT are performed, in particular when the parameters IPAR and PAR are exchanged with the CCOJs.

The proofs PROOF that the CCOJs are behaving in accordance with the goals GOAL are obtained by associating the seals SEAL with the models FMODEL and ISMODEL.

The seals SEAL can be delivered by any activity whatsoever, in particular those for exchanging the parameters PAR and IPAR. In particular, the CCOJs can deliver seals SEAL that guarantee that a regulatory operation has taken place correctly (such as the deletion of personal data after a request from the person concerned). Depending on the needs, a seal SEAL can be delivered after the activity ACTVT, or kept by the CCOJ to be used at a later moment; thus, a seal generated by an activity can be kept in the CCOJ in order to be used or delivered by another activity.

A seal SEAL generated by a device CCOJ becomes a data item DATA operated by the activities ACTVT. This is used to define the activities for transmitting the seals between activities, to other communicating devices, or to the expert system.

A seal SEAL can be materialized by a data item transmitted to the party requesting the proof, such as an electronic signature. Advantageously, the certified communicating devices CCOJ incorporate cryptographic algorithms and the keys required to calculate electronic signatures and the cryptograms that will constitute the seals SEAL.

Advantageously, the seals SEAL are unique and contain information allowing their recipients to interpret the guarantees that they carry. For example, the seals SEAL indicate, for each occurrence of an activity ACTVT:
the CCOJ that delivered the seal,
the user USR that used the certified communicating device to perform the activity ACTVT,
the data item DATA, or the resource RSRC, used to operate the activity, in particular when it is relevant for understanding the guarantees provided by the seal SEAL (for example the reference of the information definitively deleted from a database, the timestamp, etc.).

A seal SEAL delivered after an activity ACTVT constitutes a proof of non-repudiation when said seal is an electronic signature that only the CCOJ that executed said activity can calculate.

If the CCOJ must control another appliance (such as a gatekeeper that triggers an electric door opener), if this equipment is used in an industrial environment, or if it involves a portion of a larger electronic or electrotechnical assembly, a seal SEAL can be materialized by simple electrical signals. Therefore, a CCOJ can be a secure industrial controller, the electromechanical relays of which are activated by the activities ACTVT that it executes.

The embodiment of the expert system SYSXPRT depends on the assurances expected by the network manager, and on the nature of the networks NET. Preferably, the assurances provided by the expert system SYSXPRT, those provided by the certified communicating devices CCOJ, and those provided by the unconditional security properties INCSEC, are homogeneous (if the devices CCOJ are evaluated by an independent laboratory, the devices ensuring the properties INCSEC, and the expert system SYSXPRT, are too).

For the critical processes and facilities requiring high security, the use of a proof assistant to design the expert system SYSXPRT, or the communicating devices, is recommended.

An expert system SYSXPRT, the behavior of which is guaranteed, and which is accompanied by a model FMODEL, can be used as a certified communicating device CCOJ.

In the description below, the term SYSXPRTCCOJ will be understood as meaning a certified expert system SYSXPRT, accompanied by its model FMODEL, that has the characteristics of a certified communicating device CCOJ, and that can be used as such.

Advantageously, the common grammar used for the descriptions of the ARTEFACTs allows for the categorization of the technologies implemented by the communicating devices in order to ease the creation of a plurality of specialized expert systems SYSXPRT, or specialized certified expert systems SYSXPRTCCOJ.

Advantageously, an organization that uses a plurality of certified communicating devices CCOJ to propose goods and services, uses a certified expert system SYSXPRTCCOJ, so that its customers directly define the goals GOAL and the proofs PROOF that they expect for the services that they require.

Advantageously, an expert system SYSXPRT specialized in a technological domain, can entrust calculations to another expert system when it must address communicating devices, the characteristics of which fall outside of its expertise.

If an expert system SYSXPRT is designed to address a technological domain, it is programmed to interpret the formal grammar of said domain. Thus, a first expert system calls on a second expert system by transmitting to it the goals GOAL, the proofs PROOF, and the formal descriptions that it is not able to address, and the second expert system calculates the parameters on behalf of the first.

Detailed Description of the Use of the Invention for a Use Case

FIG. 10 is a diagrammatic view of a computer network in which the invention is used. This network comprises two separate areas (FIG. 10, 800, 900) for which the level of protection required is different. The network manager NM (FIG. 10, 555) is responsible for the functioning and the security of the two areas. The research area 800 comprises the dedicated local network NET (FIG. 10, 801), and the common area 900 comprises another local network NET (FIG. 10, 901). The expert system SYSXPRT (FIG. 10, 333) is connected to the two local networks 801 and 901.

The research area 800 is reserved for the most advanced research and technical studies with strategic importance for the company, the hardware (FIG. 10, 810, 891, 892, 893) is interconnected thereto by the local network NET 801, the cables of which are inaccessible (protected physical access). The staff (FIG. 10, 501, 502, 503) perform research and work on individual computers 891, 892, and 893 which are CCOJs connected to the two local networks 801 and 901.

The common area 900 is used by all of the company's staff: commercial services (FIG. 10, 515), administrative staff (FIG. 10, 525), research (FIG. 10, 501, 502, 503). In the common area 900, the interconnected hardware (FIG. 10, 891, 892, 893, 910, 915, 925) communicate via the local network NET 901 that is connected to the internet (FIG. 10, 1000) via a dedicated protection equipment item: a firewall (FIG. 10, 999).

The research area 800 has a network 801 in which the staff 501, 502, 503, are users who use the individual computers 891, 892, 893, to perform their tasks.

The research staff 501, 502 and 503 use the server 810, which is a CCOJ, to access the elements (resources and data) useful for their work (FIG. 10, 811). The network 801 provides unconditional protections INCSEC (FIG. 10, 803) which are described in a model ISMODEL. Its operational restrictions OPUSE (FIG. 10, 802) are described in a model OPMODEL.

The computers 915 and 925 are ordinary communicating devices COJ connected to the network 901 of the common area.

The server 910 is a certified communicating device CCOJ that allow access to the customer database (FIG. 10, 911) and to the data of the Intranet (FIG. 10, 912).

Unlike that of the research area, the network 901 of the common area does not provide protection PROTECT; its operational restrictions (FIG. 10, 902) are described in a model OPMODEL.

The expert system SYSXPRT is set up with the model ISMODEL of the protections INCSEC 803 of the network 801, and with the models OPMODEL of the operational restrictions OPUSE 802 and 902 of the networks 801 and 901. The users USR of the company (501, 502, 503, 515, 525, 555) are communicated to the expert system SYSXPRT, as well as their roles within the organization (research, sales department, administrative services, network manager). The expert system SYSXPRT is also set up with the cryptographic certificates and keys to authenticate the communicating devices CCOJ. It communicates with the CCOJs to collect their initial parameters IPAR and their models FMODEL.

The security properties of the protections PROTECT are classed according to four levels: HIGH, MEDIUM, LOW, NONE (i.e. no security).

FIG. 11 is a logic presentation of the formal descriptions that the expert system SYSXPRT has when it is set up, and when it has collected the initial parameters and the models FMODEL of the certified communicating devices.

The braces (FIGS. 11, 800 and 900) to the right of the figure indicate the area (800 or 900) to which the formal descriptions are connected. The certified communicating devices CCOJ 891, 892 and 893 are connected to the two networks 801 and 901, and are thus connected to the two areas 800 and 900.

For the research area, the network NET (FIG. 11, 801) comprises:

The model OPMODEL of its operational restrictions OPUSE (FIG. 11, 802)

The model ISMODEL of the unconditional protections INCSEC (FIG. 11, 803), in which appear:

the activities ACTVT803'1 to ACTVT803'$n$ that benefit from the protections PROTECT803'1 to PROTECT803'$n$. The level of the protections provided is identical, regardless of the activity ACTV: access control: LOW; confidentiality: NONE; integrity: NONE; authenticity: NONE.

The model FMODEL of the server (FIG. 11, 810), in which appear:

The activities ACTVT810'1 to ACTVT810'$n$ that benefit from the protections PROTECT810'1 to PROTECT810'$n$. The level of the protections provided is identical, regardless of the activity ACTV: access control: HIGH; confidentiality: HIGH; integrity: HIGH; authenticity: HIGH.

The models FMODEL of the individual computers (FIG. 11, 891, 892, 893) connected to the two networks (801 and 901), in which appear:

The activities ACTVT89$x$'1 to ACTVT89$x$'$n$ that benefit from the protections PROTECT89$x$'1 to PROTECT89$x$0'$n$. The level of the protections provided is identical, regardless of the activity ACTV: access control: HIGH; confidentiality: HIGH; integrity: HIGH; authenticity: HIGH.

For the common area, the network NET (FIG. 11, 901) comprises:

The models FMODEL of the individual computers (FIG. 11, 891, 892, 893) connected to the two networks (801 and 802), as indicated above.

The model OPMODEL of its operational restrictions OPUSE (FIG. 11, 902) which includes the descriptions of the ordinary communicating devices COJ (FIG. 11, 915, 925).

The model FMODEL of the server (FIG. 11, 910), in which appear:

The activities ACTVT910'1 to ACTVT910'$n$ that benefit from the protections PROTECT910'1 to PROTECT910'$n$. The level of the protections provided is identical, regardless of the activity ACTV: access control: HIGH; confidentiality: MEDIUM; integrity: MEDIUM; authenticity: MEDIUM.

The model FMODEL of the firewall (FIG. 11, 999), in which appear:

The activities ACTVT999'1 to ACTVT999'$n$ that benefit from the protections PROTECT999'1 to PROTECT999'$n$. The level of the protections provided is identical, regardless of the activity ACTV: access control: HIGH; confidentiality: MEDIUM; integrity: MEDIUM; authenticity: MEDIUM.

Even when multiple activities ACTVT benefit from the same levels of protection PROTECT, it can be necessary to describe them separately if the solutions implemented to provide the protections PROTECT are different from one activity to another. For example, both the symmetric cryptography and the asymmetric cryptography allow for checking the authentication with a HIGH level, however the CCOJs do not all have two types of cryptography, or use different systems.

The network manager NM (555) uses the expert system SYSXPRT to indicate the functions and the protections that he/she requires for the networks 801 and 901. He/she interacts with the expert system thanks to the graphical user interface that presents him/her with views of the company's IT facilities (such as that in FIG. 10):

He/she has the following needs:

The information on the company's customer must be protected (FIG. 10, 911), said information being only accessible to commercial users 515. This information is subjected to the laws and regulations on personal data protection; it is confidential, its integrity and authenticity must be ensured. The minimum level of protection is MEDIUM, regardless of the operations performed.

The company's Intranet (FIG. 10, 912) is accessible to all of the company's staff. This does not involve confidential information, however the authenticity and integrity thereof are important. The minimum levels of protection are LOW for access control and confidentiality, and MEDIUM for integrity and authenticity.

Access to the Internet 1000 passes via a firewall 999 which limits communications to the HTML protocols and emails, for all of the company's staff. The minimum levels of protection are LOW for access control, and MEDIUM for confidentiality, integrity and authenticity.

The research programs and information (FIG. 10, 811) are confidential and must not enter the common area; only the users 501, 502, 503, 555 are authorized access thereto. The integrity, confidentiality and authenticity must be continually ensured.

Based on the needs of the network manager NM and his/her use of the graphical user interface, the expert system helps the network manager to define the goals GOAL to be achieved.

FIGS. 12 and 13 are logical presentations of the goals GOAL and proofs PROOF derived from the use of the expert system SYSXPRT by the network manager 555.

The braces (FIG. 12, 811 and FIG. 13, 911, 912, 999) to the right of the figures indicate the elements in FIG. 10 to which the goals GOAL refer.

For the data and the resources 811 used in the research area, the goals GOAL and the proofs PROOF are as follows:

The goal GOAL 871 comprises two usage conditions CDT (FIGS. 12, 8211 and 8212), it concerns the users USR 501, 502, 503 in the network NET (FIG. 12, 801) of the research area.

The usage condition 8211 comprises:

six activities ACTVT (FIG. 12, 83101, 83102, 83103, 83104, 83105, 83106) that concern the same data item DATA (FIG. 12, 851) but according to six different actions ACT (FIG. 12, 86101, 86102, 86103, 86104, 86105, 86106), a seventh activity ACTVT (FIG. 12, 83111) that concerns a resource RSRC (FIG. 12, 852) and its use USE (FIG. 12, 86111), a protection PROTECT (FIG. 12, 8411).

The actions 86101, 86102, 86103, 86104, 86105, 86106 are respectively: Read, Write, Delete, Create, Run, Copy. The use 86111 corresponds to the first use of the resource 852.

The protections PROTECT (FIG. 12, 8411) defined for the usage condition 8211 are: access control: HIGH; confidentiality: HIGH; integrity: MEDIUM; authenticity: MEDIUM.

The usage condition 8212 comprises:

an activity ACTVT (FIG. 12, 83112) that concerns a resource RSRC (FIG. 12, 852) and its use USE (FIG. 12, 86112), a protection PROTECT (FIG. 12, 8412).

The use 86112 corresponds to the second use of the resource 852. The protections PROTECT (FIG. 12, 8412) defined for the usage condition 8212 are: access control: HIGH; confidentiality: HIGH; integrity: HIGH; authenticity: HIGH A proof PROOF (FIG. 12, 881) is requested to certify that the goal 871 has been achieved.

The goal GOAL 872 comprises a usage condition CDT (FIG. 12, 822), it concerns a user USR (FIG. 12, 555) who is also the network manager NM, and applies in the network NET (FIG. 12, 801) of the research area.

The usage condition 822 comprises:

two activities ACTVT (FIG. 12, 83201, 83202) that concern a resource RSRC (FIG. 12, 852) according to two uses USE (FIG. 12, 86201, 86202), a protection PROTECT (FIG. 12, 842).

The use 86201 corresponds to the monitoring of the usage time of the resource 852. The use 86202 corresponds to the monitoring of the power consumed by the resource 852. The protections PROTECT (FIG. 12, 842) defined for the usage condition 822 are: access control: MEDIUM; confidentiality: MEDIUM; integrity: MEDIUM; authenticity: MEDIUM.

A proof PROOF (FIG. 12, 882) is requested to certify that the goal 872 has been achieved.

For the customer database 911, the goals GOAL and the proofs PROOF are as follows:

The goal GOAL 971 comprises a usage condition CDT (FIG. 13, 921), it concerns the commercial users USR (FIG. 13, 515), and applies to the network 901.

The usage condition 921 comprises:

four activities ACTVT (FIG. 13, 93101, 93102, 93103, 93104) that concern data DATA (FIG. 13, 951) according to four actions ACT (FIG. 13, 96101, 96102, 96103, 96104), a protection PROTECT (FIG. 13, 941).

The actions 96101, 96102, 96103, 96104 are respectively: Read, Update, Create, Delete The protections PROTECT (FIG. 13, 941) defined for the usage condition 921 are: access control: MEDIUM; confidentiality: MEDIUM; integrity: MEDIUM; authenticity: MEDIUM.

The data 951 is the personal information that is subject to national or international laws. These regulations stipulate that data must be processed according to certain rules, and in compliance with certain limits. The network manager 555 has transmitted this information to the expert system so that it checks that the activities on the data comply with the laws in effect.

A proof PROOF (FIG. 12, 981) is requested to certify that the goal 971 has been achieved.

For the data of the Intranet 912, the goals GOAL and the proofs PROOF are as follows:

The goal GOAL 972 comprises a usage condition CDT (FIG. 13, 922), it concerns all users USR (FIG. 13, 501, 502, 503, 515, 525, 555), and applies to the network 901.

The usage condition 922 comprises:

two activities ACTVT (FIG. 13, 93201, 93202) that concern a data item DATA (FIG. 13, 952) according to two actions ACT (FIG. 13, 96201, 96202), a protection PROTECT (FIG. 13, 942).

The actions 96201, 96202, are respectively: access to the product pages, access to personal pages.

The protections PROTECT (FIG. 13, 942) defined for the usage condition 922 are: access control: LOW; confidentiality: LOW; integrity: MEDIUM; authenticity: MEDIUM.

A proof PROOF (FIG. 12, 982) is requested to certify that the goal 972 has been achieved.

For the data of the Intranet access 999, the goals GOAL and the proofs PROOF are as follows:

The goal GOAL 979 comprises a usage condition CDT (FIG. 13, 929), it concerns all users USR (FIG. 13, 501, 502, 503, 515, 525, 555), and applies to the network 901.

The usage condition 929 comprises:

two activities ACTVT (FIG. 13, 93901, 93902) that concern a data item DATA (FIG. 13, 959) according to two actions ACT (FIG. 13, 96901, 96902), a protection PROTECT (FIG. 13, 949).

The actions 96901, 96902, are respectively: HTML access, email access.

The protections PROTECT (FIG. 13, 949) defined for the usage condition 929 are: access control: LOW; confidentiality: MEDIUM; integrity: MEDIUM; authenticity: MEDIUM.

A proof PROOF (FIG. 12, 989) is requested to certify that the goal 979 has been achieved.

Based on the ARTEFACT that it has (descriptions of the networks, communicating devices, goals, proofs, users, etc.), the expert system SYSXPRT is ready to calculate the parameters PAR to be transmitted to the certified communicating devices CCOJ.

It ensures that the data server 910 complies with the international regulations and laws on protecting personal data, by checking that the essential characteristics are described in the model FMODEL of the server.

Subsequently, the expert system SYSXPRT calculates the parameters PAR and transmits these to the CCOJs.

Upon receipt of the calculated parameters PAR, the CCOJs deliver seals SEAL that certify that said parameters have been successfully received and taken into account by the certified communicating devices.

The expert system SYSXPRT verifies the seals SEAL that it receives, and attaches them to the models FMODEL of the CCOJs to establish the proofs PROOF that the goals GOAL have been achieved.

The invention claimed is:

1. A computer network system, comprising:
at least one communication network comprising networking hardware,
a certified communicating device connected to the at least one communication network, wherein the certified communicating device is associated with at least one of an asset or an activity,
at least one formal model associated with the certified communicating device, wherein the at least one formal model specifies
at least one parameter determining a behavior of the certified communicating device, and
at least one protection against at least one attack, the at least one protection against the at least one attack being provided by the certified communication device at least according to the at least one parameter,
wherein the at least one protection is defined by at least one of
access control by prohibiting unauthorized access to the at least one of an asset or an activity,
confidentiality by prohibiting at least one of copying or theft of the at least one of an asset or an activity,
integrity by prohibiting modifying of the at least one of an asset or an activity, and
authenticity by detecting modification before use of the at least one of an asset or an activity, and
at least one expert system connected to the at least one communication network, wherein the at least one expert system
calculates at least one calculated parameter for the certified communicating device based on the at least one formal model associated with the certified communicating device and at least one security goal against the at least one attack, and
makes available the at least one calculated parameter to the certified communicating device,
wherein the certified communication device modifies the behavior using the at least one calculated parameter to provide the at least one protection against the at least one attack.

2. The computer network according to claim 1, wherein the certified communicating device is adapted to deliver at least one seal certifying that the at least one protection against the at least one attack is performed according to the at least one calculated parameter such that the behavior of the certified communication device corresponds to the at least one security goal against the at least one attack.

3. The computer network according to claim 2, comprising a plurality of the certified communicating devices being connected to the at least one communication network, respective formal models being associated with respective ones of the plurality of the certified communicating devices, the at least one expert system certifying that the at least one security goal against the at least one attack has been reached, by associating the respective formal models with respective seals delivered by the respective ones of the plurality of the certified communicating devices.

4. A method of securing and guaranteeing a behavior of a computer network system comprising at least one communication network comprising networking hardware, a certified communicating device connected to the at least one communication network, wherein the certified communicating device is associated with at least one of an asset or an activity, at least one formal model associated with the certified communicating device, wherein the at least one formal model specifies at least one parameter determining at least one behavior of the certified communicating device, and at least one protection against at least one attack, the at least one protection against the at least one attack being provided by the certified communication device at least according to the at least one parameter, the at least one protection being defined by at least one of access control by prohibiting unauthorized access to the at least one of an asset or an activity, confidentiality by prohibiting at least one of copying or theft of the at least one of an asset or an activity, integrity by prohibiting modifying of the at least one of an asset or an activity, and authenticity by detecting modification before use of the at least one of an asset or an activity, and at least one expert system connected to the at least one communication network, wherein the at least one expert system calculates at least one calculated parameter for the certified communicating device based on the at least one formal model associated with the certified communicating device and at least one security goal against the at least one attack and makes available the at least one calculated parameter to the certified communicating device, the method comprising:

making available to the at least one expert system the at least one formal model associated with the certified communicating device, making available to the expert system the at least one security goal against the at least one attack, calculating, by the at least one expert system, the at least one calculated parameter for the certified communicating device based on the at least one formal model associated with the certified communicating device and the at least one security goal, making available the at least one calculated parameter by the at least one expert system to the certified communicating device, and using, by the certified communication device, the at least one calculated parameter to provide the at least one protection against the at least one attack.

5. The method of securing and guaranteeing the behavior of a computer network according to claim 4, further comprising:

delivering, by the certified communicating device, at least one seal certifying that the at least one protection against the at least one attack is performed according to the at least one calculated parameter such that the behavior of the certified communication device corresponds to the at least one security goal against the at least one attack, and receiving, by the at least one expert system, the at least one seal delivered by the certified communicating device.

6. The method of securing and guaranteeing the behavior of a computer network according to claim 5, the computer network comprising a plurality of the certified communicating devices, the plurality of certified communicating devices being connected to the at least one communication network, respective formal models being associated with respective ones of the plurality of certified communicating devices, further comprising:

establishing, by the at least one expert system, a proof certifying that the at least one security goal against the at least one attack has been reached by associating the respective formal models with respective seals delivered by the respective ones of the plurality of certified communicating devices.

7. The method according to claim 4, wherein the at least one expert system takes into account descriptions of the at least one communication network when calculating the at least one calculated parameter for the certified communicating device.

8. The computer network according to claim 1, wherein the at least one formal model further specifies at least one activity, and wherein, when the at least one activity uses a resource, the certified communicating device performs at least one of a monitoring operation, a limiting operation, or a metering operation, each of which allows remunerations determined according to a value allocated to the use of the resource.

9. A certified communication device associated with at least one of an asset or an activity, wherein the certified communication device provides at least one protection against at least one external attack to the at least one of the asset or the activity, wherein the at least one protection is defined by at least one of access control by prohibiting unauthorized access to the at least one of an asset or an activity, confidentiality by prohibiting at least one of copying or theft of the at least one of an asset or an activity, integrity by prohibiting modifying of the at least one of an asset or an activity, and authenticity by detecting modification before use of the at least one of an asset or an activity, and wherein the certified communication device comprises instructions, stored in a memory accessible by the certified communication device, that, when executed, perform a method, comprising:

reading, from the memory, at least one initial parameter of the certified communication device, wherein the at least one initial parameter contains information concerning at least one operational behavior of the certified communication device with respect to the at least one protection against the at least one external attack;

receiving, from an expert system, at least one calculated parameter using information from a formal model, wherein the at least one calculated parameter conforms to at least one guaranteed behavior of the certified communication device with respect to the at least one protection against at least one external attack;

modifying, by the certified communication device, the at least one operational behavior of the certified communication device with respect to the at least one protection against at least one external attack based on the at least one calculated parameter to comply with the at least one guaranteed behavior; and applying, by the certified communication device, the at least one protection against the at least one external attack to the at least one of the asset or the activity taking advantage of the at least one guaranteed behavior.

10. The certified communicating device according to claim 9, wherein the method further comprises:

delivering, by the certified communication device, at least one seal certifying that the at least one operational behavior of the certified communication device complies with the at least one guaranteed behavior.

11. The certified communicating device according to claim 10, wherein the activity comprises at least one first activity that calls on at least one second activity, the method further comprising:

delivering, by the at least one second activity, at least one first seal to the at least one first activity, receiving, by the at least one first activity, the at least one first seal, verifying, by the at least one first activity, the at least one first seal, and delivering, by the first activity, at least one second seal that certifies the implementation thereof and of that of the at least one second activity in accordance with the at least one guaranteed behavior, without rechecking the at least one first seal delivered by the at least one second activity to the at least one first activity.

12. The certified communicating device according to claim 9, wherein, when the activity uses a resource, the method further comprises:

a monitoring operation, a limiting operation, or a metering operation, each of which allows remunerations determined according to a value allocated to the use of the resource.

* * * * *